United States Patent [19]
Bauman et al.

[11] Patent Number: 5,617,375
[45] Date of Patent: Apr. 1, 1997

[54] DAYCLOCK CARRY AND COMPARE TREE

[75] Inventors: Mitchell A. Bauman, Circle Pines; James L. Federici, Shoreview, both of Minn.

[73] Assignee: Unisys Corporation, Blue Bell, Pa.

[21] Appl. No.: 577,908

[22] Filed: Dec. 4, 1995

[51] Int. Cl.⁶ .............. G04B 47/00; G06F 1/04; G06F 1/12
[52] U.S. Cl. .............. 368/10; 368/156; 364/705.07
[58] Field of Search .............. 368/10, 155–156; 364/705.06, 705.07, 705.08, 569; 395/550

[56] References Cited

U.S. PATENT DOCUMENTS

| | | | |
|---|---|---|---|
| 4,122,498 | 10/1978 | Dyer | 360/6 |
| 4,349,890 | 9/1982 | Chang | 364/900 |
| 4,708,491 | 11/1987 | Luitje | 368/156 |
| 4,764,863 | 8/1988 | Silverthorn, III et al. | 364/200 |
| 4,952,367 | 8/1990 | Porter et al. | 364/200 |
| 5,146,585 | 9/1992 | Smith, III | 395/550 |
| 5,255,182 | 10/1993 | Adams | 364/405 |
| 5,265,240 | 11/1993 | Galbraith et al. | 395/550 |
| 5,270,475 | 12/1993 | Weiss et al. | 84/603 |
| 5,327,468 | 7/1994 | Edblad et al. | 375/107 |
| 5,355,161 | 10/1994 | Bird et al. | 348/2 |
| 5,422,862 | 6/1995 | Wisor | 368/10 |

*Primary Examiner*—Vit W. Miska
*Attorney, Agent, or Firm*—Nawrocki, Rooney & Sivertson, P.A.

[57] ABSTRACT

An apparatus for and method of efficiently providing a modular dayclock within a data processing system. This is accomplished by dividing the dayclock hardware into a number of dayclock modules configured to operate in a bit serial fashion. This allows the dayclock to accommodate a variety of dayclock word widths by simply varying the number of dayclock modules provided. Further, since the dayclock may operate serially, rather than in parallel fashion, the number of dayclock module I/O's and board route channels may be substantially reduced. Finally, all control logic may be provided directly in the dayclock modules, thereby eliminating the need for a central dayclock controller.

22 Claims, 16 Drawing Sheets

| CLOCK CYCLE | 1 | 2 | 3 |
|---|---|---|---|
| DAYCLOCK MODULE 0 | CLOCK ADVANCE. CARRY GEN. | GREATER THAN. EQUAL TO | |
| DAYCLOCK MODULE 1 | CLOCK ADVANCE. CARRY GEN. | GREATER THAN. EQUAL TO | |
| DAYCLOCK MODULE 2 | CLOCK ADVANCE. CARRY GEN. | GREATER THAN. EQUAL TO | |
| DAYCLOCK MODULE 3 | CLOCK ADVANCE. | GREATER THAN. EQUAL TO | |
| CONTROL LOGIC | | ADVANCE CARRIES | UP1 |

INCREMENT PULSE RECEIVED

FIG. 3

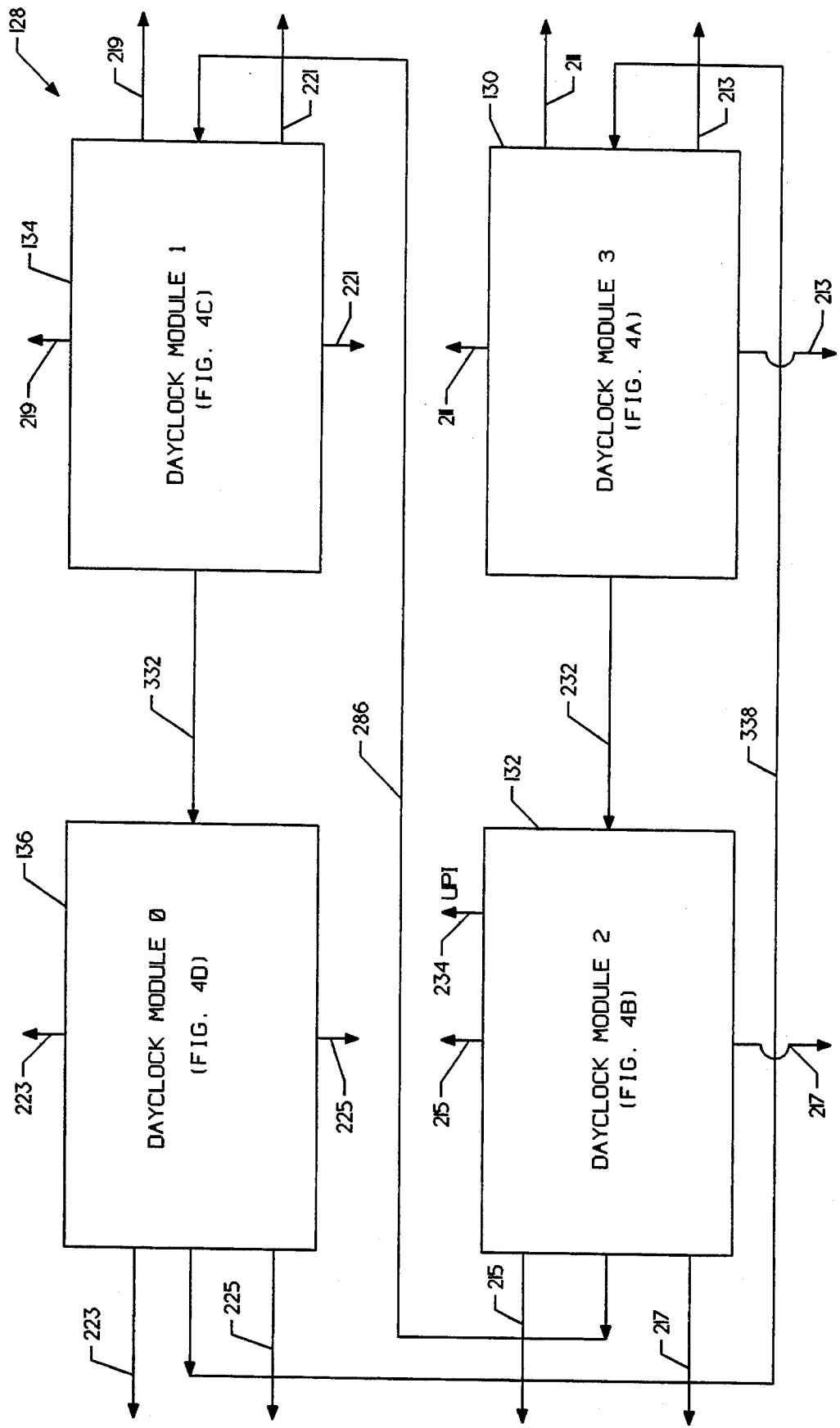

| PREFERRED MODE | | | ALTERNATE MODE | |
|---|---|---|---|---|
| DAYCLOCK MODULE 0 | BITS 0-8 OF WORDS 0 AND 1 | | DAYCLOCK MODULE 0 | BITS 0-17 OF WORDS 0 AND 1 |
| DAYCLOCK MODULE 1 | BITS 9-17 OF WORDS 0 AND 1 | | DAYCLOCK MODULE 1 | BITS 18-35 OF WORDS 0 AND 1 |
| DAYCLOCK MODULE 2 | BITS 18-26 OF WORDS 0 AND 1 | | | |
| DAYCLOCK MODULE 3 | BITS 27-35 OF WORDS 0 AND 1 | | | |

DAYCLOCK CARRY AND COMPARE TREE

BACKGROUND OF THE INVENTION

1. Field of the Invention

The present invention generally relates to maintaining system time in a computer, More particularly, it relates to a modular implementation of a system dayclock which is capable of being partitioned amongst a number of bit slice modules.

2. Description of the Prior Art

A key element of general purpose data processing systems is the ability to maintain system time. In a typical system, the system time may be generated using a dayclock mechanism or equivalent. Dayclocks may be provided in either hardware or software, but are typically triggered off a pulsed signal having a regular period, such as the output of an oscillator.

The ability to maintain an accurate dayclock is important in many applications, and in particular high reliability real time data processing applications such as banking systems or airline reservations systems. In these applications, the dayclock may be used, inter alia, to time stamp data entries, thereby indicating the time sequence that the data entries are made. It can readily be seen that in an airline reservation application, the time sequence that airline reservations are made may be vitally important to the proper operation of the system. Similarly, the time that a particular banking transaction is made, relative to other transactions, may be important to maintain the integrity of the system.

One approach for generating a dayclock is suggested in U.S. Pat. No. 4,349,890 issued to Cheng. Cheng suggests generating a dayclock from the computer system clock. Cheng utilizes a counter circuit within a preselected number of bit positions to determine the elapsed time capacity and the resolution of the dayclock. Cheng relates the processor clock cycle to the time of day duty cycle, and thus, does not require reference to a time standard for checking the pulse source.

U.S. Pat. No. 4,708,491 issued to Luitje suggests using firmware to automatically adjust a time base used by the computer's dayclock. That is, Luitje suggests using a microcomputer with a timer system that is controlled by a crystal oscillator. All timing functions are related to a 16-bit free running counter where the counter is clocked by the output of the oscillator after the frequency of the oscillator is divided down by a prescaler circuit. The output of the prescaler circuit is measured to determine the frequency of the divided down clock, and this value is stored in an EEPROM to be used for computing a correction term between the effective frequency needed for the dayclock and the measured frequency. This approach, however, requires the use of a crystal oscillator to generate the correction term used for tuning the fundamental unit of time used to increment the counter.

Another approach uses a number of dayclock elements, wherein each dayclock element is directly connected to a central dayclock control element. Because each dayclock element must be directly connected to the central control element, this approach may require a substantial number of input/output pins and board routing channels. Further, this approach is essentially a singular design, and a separate control element may be required for each variation of the number and size of dayclock bit slices that make up a full dayclock.

It is often desirable and frequently necessary to provide multiple dayclocks. For example, multiple dayclocks may be necessary to allow multiple processors to exchange messages or access the same memory storage devices. An approach for implementing a number of dayclocks within a computer processing system is suggested in U.S. Pat. No. 5,146,585 issued to Smith. Smith suggests a fault tolerance synchronization mechanism consisting of dual redundant dayclock synchronization sources in a number of dayclock slave elements. Each of the dayclock slave elements serve as dayclocks in a number of corresponding processors within a system. Here, the redundant dayclock sources distribute a time of day synchronization signal to each of the dayclock slave elements. To achieve better conformity to real time, Smith suggests correcting the generator reference signal by summing predetermined numbers of cycles of the signal and comparing the result to a more precise time standard.

A limitation of all of the above prior art approaches is that a substantial amount of hardware is required in the implementation thereof, including a substantial amount of input/output pins and board route channels. This is particularly problematic when high density integrated circuits are employed where the number of input and output pins is limited relative to the amount of logic elements provided. Further, the above prior art schemes emphasis singular design approaches, rather than a modular approach wherein dayclock elements may be combined as necessary to accommodate various bit slice arrangements.

SUMMARY OF THE INVENTION

The present invention overcomes many of the disadvantages of the prior art by providing a method and apparatus for efficiently providing a modular dayclock within a data processing system. This is accomplished by dividing the dayclock hardware into a number of dayclock modules configured to operate in a bit serial fashion. This allows the dayclock to accommodate a variety of dayclock bit slice arrangements by simply varying the number of dayclock modules provided. Further, since the dayclock may operate serially, rather than in parallel fashion, the number of dayclock module I/O's and board route channels may be substantially reduced. Finally, all control logic may be provided directly in the dayclock modules, thereby eliminating the need for a central dayclock controller.

In an exemplary embodiment, the dayclock may have a dayclock counter to maintain system time. The dayclock counter may be divided into a number of smaller corresponding counter modules. Each of the number of corresponding counter modules may be provided in one of the number of dayclock modules, and may be coupled together in a bit serial fashion. That is, each counter may provide a carry signal to the next succeeding counter to perfect the counter function. During system operation, the corresponding counter modules may be incremented in a bit serial manner, wherein each carry signal may be propagated to the next succeeding counter module during successive clock cycles. Thus, after a predetermined number of cycles, corresponding to the number of dayclock modules used, an incrementation cycle may be complete.

A dayclock register may be provided for storing the current dayclock time. It is contemplated that the dayclock register may be read by an instruction processor, or the like, at any time to timestamp an event. As with the counter module, the dayclock register may be divided into a number of dayclock register modules, wherein each of the number of dayclock register modules may be provided in one of the dayclock modules. Similarly, a compare register may be provided to store a maximum count value. The compare register may also be divided into a number of compare register modules, wherein each of the number of compare register modules may be provided in one of the dayclock modules.

Each of the counter modules is coupled to a corresponding one of the dayclock register modules. The counter module may include combinational logic such that the counter module and the corresponding dayclock register module may provide the counter function. That is, during the incrementation cycle, as described above, each of the corresponding counter module may provide an incremented dayclock value to the corresponding dayclock register module. The corresponding dayclock register may then be advanced by clocking in the incremented dayclock counter value. It is contemplated each of the dayclock register modules may be advanced in parallel because, as indicated above, an instruction processor may read the current dayclock value from the dayclock register at any time.

After the dayclock register modules are advanced, the current dayclock time is compared to the maximum count value stored in the dayclock compare register. It is contemplated that each dayclock module may include a compare module for providing this compare function. Each compare module may compare the portion of the current dayclock time stored in the corresponding dayclock register module with the portion of the maximum count value stored in the corresponding compare register module.

The compare module may then provide a greater-than-or-equal-to (GE) signal to the next succeeding stage, if applicable. That is, when the value of the dayclock register module equals or exceeds that of the corresponding compare register module, a GE signal may be provided to the next succeeding stage, in a bit serial fashion. Thus, after a predetermined number of cycles, corresponding to the number of dayclock modules used, it is determined if the value stored in the collective dayclock register equals or exceeds the value stored in the collective compare register. When the value of the collective dayclock register equals or exceeds that of the value stored in the collective compare register, a universal processor interrupt (UPI) is issued to the data processing system. Thereafter, the dayclock may be rearmed after the dayclock compare register is reloaded with a new compare value.

It is contemplated that each dayclock module may have a control block for controlling the operation of each dayclock module. In an exemplary embodiment, the control block may include a sequencer for providing control signals to, inter alia, the counter module, the increment register module, the comparison register module, and the comparator module. The control block may receive a number of control signals, including a module number signal, to assure that each dayclock module properly interacts with the other dayclock modules. This is particularly important because the dayclock modules may operate in a serial fashion, and the position of each dayclock module in the serial "chain" is critical to the proper operation thereof.

Because the dayclock modules may be interconnected in a bit serial fashion, such that each module forms a portion of a total dayclock, a substantial savings in the number of I/O's and board route channels is realized. For example, if four dayclock modules are interconnected to implement a 72-bit dayclock where each module represents two words, each dayclock module may contain two 9-bit quarterwords for the 72-bit dayclock. It is estimated that this configuration may reduce the number of I/O pins and board route channels consumed by the dayclock hardware by up to 75% over prior art schemes.

It is realized that clocking the dayclock registers in the above referenced serial fashion may take more time to provide a dayclock update. However, in practice the system clock driving the dayclock modules is much faster than the required system dayclock update period. For example, a typical system dayclock update period may be in the range of one microsecond. In contrast, the system clock driving the dayclock modules may have a clock period on the order of 25 nano-seconds. Thus, ample time exists to provide a substantial number of dayclock modules in a bit serial fashion and still meet the system dayclock update requirements.

Finally, it is contemplated that the dayclock modules may be implemented using high density logic devices such as Application Specific Integrated Circuits (ASIC). Since the dayclock modules are "modular" in design, these elements can be interconnected to form a variety of configurations to address various system data bit slice arrangements.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3 is a timing diagram showing the counter incrementation thing for the dayclock scheme shown in FIG. 1 and FIG. 2;

FIG. 4 is a block diagram showing the interconnection of four dayclock modules 0-3 in accordance with an exemplary embodiment of the present invention;

FIG. 8 is a table showing the allocation of the dayclock register across the dayclock modules of the exemplary embodiments shown in FIG. 4 and FIG. 5;

DETAILED DESCRIPTION OF THE PREFERRED EMBODIMENTS

Figure 1:
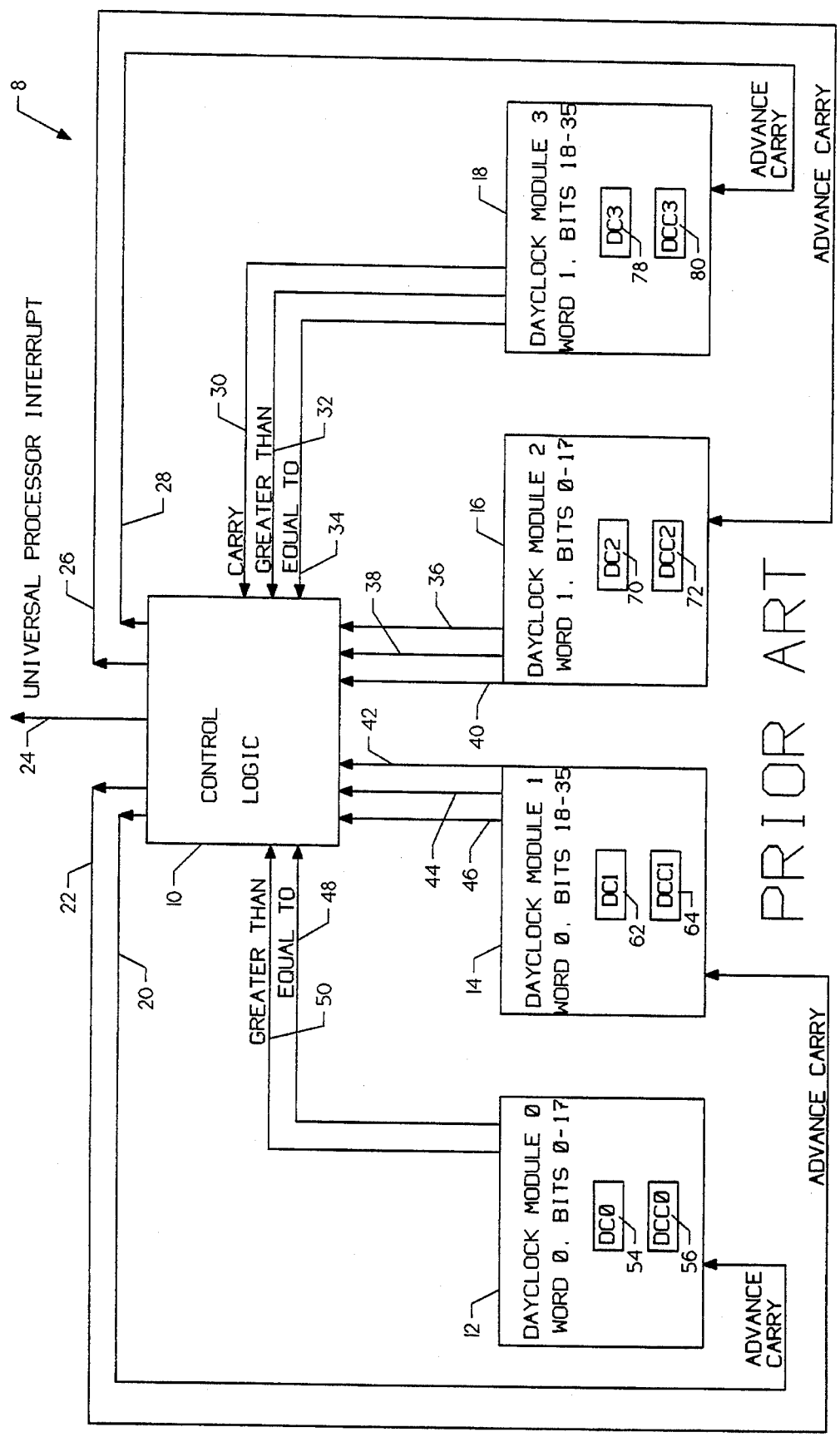
FIG. 1 is a block diagram of a typical prior art dayclock scheme.

FIG. 1 is a block diagram of a typical prior art dayclock scheme. The diagram is generally shown at 8. Dayclock module-0 12, dayclock module-1 14, dayclock module-2 16, and dayclock module-3 18 collectively provide a 72-bit dayclock register that can be loaded or read in entirety by an instruction processor or the like. In the typical prior art scheme shown in FIG. 1, the dayclock register may be divided into three fields. The first field is 15 bits in length and consists of bits 0–14 of word-0, and is always loaded with a value of zero. The second field is the dayclock counter value, which is 52 bits in length and consists of bits 15–35 of word-0 and bits 0–30 of word-1. The third field is the read counter value, which is 5 bits in length and consists of bits 31–35 of word-1. The dayclock counter field contains the current dayclock time. The contents of the dayclock register are architecturally undefined if the dayclock counter overruns the 52 bit field for storing the current dayclock time.

Each dayclock module contains 18 bits of the 72-bit dayclock register. For example DC0 54 contains the 18 most significant bits of the 72-bit dayclock register, DC1 62 contains the 18 second most significant bits, and DC3 78 contains the 18 least significant bits thereof.

In addition, dayclock modules 12, 14, 16, and 18 collectively provide a 72-bit dayclock compare register that is loaded periodically by an instruction processor or the like. The compare register is also divided into three fields. The first field is 15 bits in length and is always loaded with a value of zero. The second field is 52 bits in length and is loaded with the maximum count value for determining a maximum time period. The third field is 5 bits in length and is always loaded with a value of zero.

Further, each dayclock module contains 18 bits of the 72-bit dayclock compare register. For example DCC0 56 contains the 18 most significant bits of the 72-bit compare register, DCC1 64 contains the 18 second most significant bits, and DCC3 80 contains the 18 least significant bits thereof.

Each dayclock module 12, 14, 16, and 18 accepts an advance carry input from control logic 10 as shown at 20, 22, 26, and 28, respectively. Further, dayclock modules 14, 16, and 18 provide a carry signal to control logic 10 as shown at 46, 40, and 30, respectively. Similarly, each dayclock module 12, 14, 16, and 18 provides a greater-than (G) signal to control logic 10 as shown at 50, 44, 38, and 32, respectively. Finally, each dayclock module 12, 14, 16, and 18 provides an equal-to (EQ) signal to control logic 10 as shown at 48, 42, 36, and 34, respectively.

Figure 2:
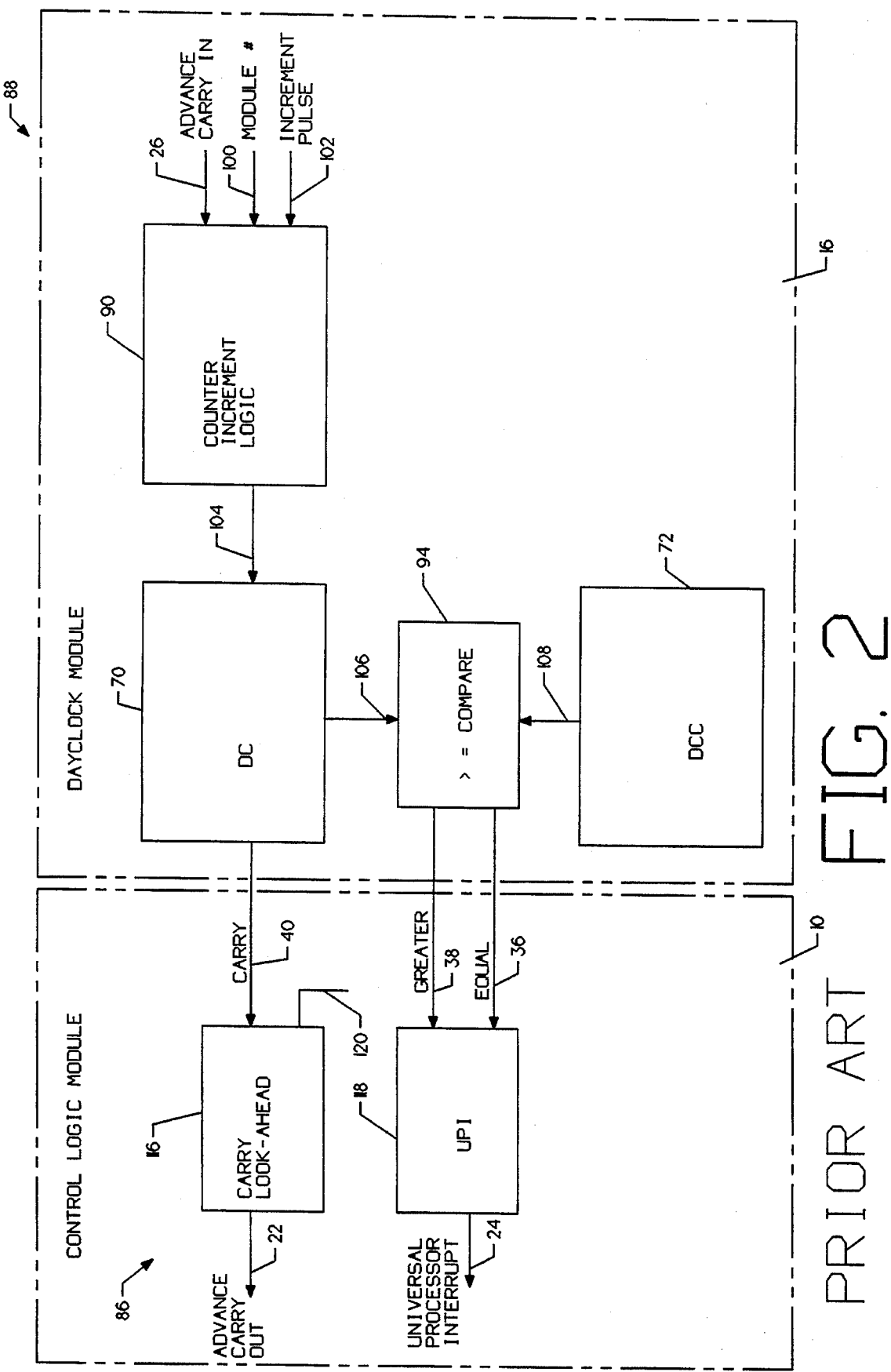
FIG. 2 is a block diagram showing a portion of one of the four dayclock modules of FIG. 1, and the corresponding portion of the control logic module.

Although not shown for clarity, each dayclock register 54, 62, 70, and 78, may also include a counter increment block (see FIG. 2). Each counter increment block periodically increments the dayclock registers located in the corresponding dayclock module. In this configuration, the 52 bit dayclock counter is incremented, beginning with bit 30 of word-1 in DC3 78 up to a total count which may include the most significant bit, bit 15 of word-0 in DC0 54.

The 52-bit dayclock counter, including dayclock register 54, 62, 70, and 78, may be incremented with each system clock cycle. Further, and as indicated above, the dayclock registers 54, 62, 70, and 78, are incremented simultaneously on receipt of the increment pulse. If any dayclock register 54, 62, 70, or 78 generates a carry bit as a result of this incrementation, it is output to control logic 10 as described above. Upon receipt of a second clock cycle, the carries are clocked out of control logic 10 via paths 20, 22, and 26, to increment the dayclock register count of the next higher order dayclock register. A comparison is performed between the dayclock registers 54, 62, 70, and 78 and the dayclock compare registers 56, 64, 72, and 80 after the 52-bit dayclock counter is advanced. For example, in dayclock module-1 14 the comparison is performed between DC1 62 and DCC1 64.

The result of this comparison is output from the respective dayclock module where the comparison is performed. For example, when DC1 62 is compared to DCC1 64, if the value of DC1 62 equals DCC1 64, the signal equal-to 42 is asserted. Similarly, if the value of DC1 62 exceeds the value of DCC1 64, greater-than 44 is asserted. When the collective value contained in dayclock registers 54, 62, 70, and 78 equals or exceeds that of compare registers 56, 64, 72, and 80, a universal processor interrupt is issued via interface 24.

FIG. 2 is a block diagram showing a portion of dayclock module 16 shown in FIG. 1, and a corresponding portion of control logic block 10. The diagram is shown generally at 88. As indicated above, dayclock module 16 includes a counter increment block 90, a dayclock register 70, a compare module 94, and a dayclock compare register 72 (see FIG. 1).

As indicated with reference to FIG. 1, dayclock register DC2 70 and dayclock compare register DCC2 72 each comprise 18 bit half words. The dayclock modules 12, 14, and 18 collectively form the remainder of the 72 bit dayclock and 72 bit compare register. Counter increment block 90 may increment dayclock register DC2 70 only when increment-pulse 102 changes state and when advance carry 26 is asserted. The module # input on path 100 identifies the position that the dayclock module 16 takes with respect to the other dayclock modules 12, 14, and 18 within the system. The advance-carry-in signal 28 is always asserted from control logic module 10.

Control logic 10 receives a carry input on path 40 from dayclock register DC2 70, a greater-than input on path 38 from compare module 94, and an equal-to input on path 36 also from compare module 94. Control logic 10 contains the equivalent of four of control logic modules 86 to service the four dayclock modules 12, 14, 16, and 18, respectively. The operation of control logic module 86 is the same as control logic 10 shown in FIG. 1. That is, upon receipt of a carry input on path 38, carry look-ahead block 116 provides an advance carry out signal on path 22 to the next higher order dayclock module. The next higher order dayclock module is determined by the module # input on path 100.

Universal processor interrupt UPI 24 is asserted if the greater-than signal on path 50 or equal-to signal on path 48 is asserted, and the greater-than signal on path 44 or the equal-to signals on paths 48 and 42 are asserted, and the greater-than signal on path 32 or the equal-to signal on paths 48, 42 and 36 are asserted, and the greater-than signal on path 32 or all of the equal-to signals on paths 48, 42, 36 and 34 are asserted. That is, if the 72 bit dayclock value stored in dayclock registers 54, 58, 62, 66, 70, 74, 78, and 82 across all four modules 12, 14, 16, and 18 is greater than or equal to the 72 bit compare value stored in compare registers 56, 60, 64, 68, 72, 76, 80, and 84, then UPI 24 is asserted. The dayclock compare register is loaded by the instruction processor of the like after each UPI 24 assertion.

FIG. 3 is a timing diagram showing the counter incrementation timing for the prior art dayclock scheme shown in FIG. 1 and FIG. 2. The diagram is generally shown at 127. The top row shows three clock cycles sequenced in time. The next four rows of FIG. 3 show the corresponding activity of each of four dayclock modules. Finally, the last row shows the corresponding activity of the control logic.

The dayclock module-0 entry corresponds to the activity of dayclock module-0 12 of FIG. 1. The dayclock module-1 entry corresponds to the activity of dayclock module-1 14 of FIG. 1. The dayclock module-2 entry corresponds to the activity of dayclock module-2 16 of FIG. 1. Finally, the dayclock module-3 entry corresponds to the activity of dayclock module-3 18 of FIG. 1. Similarly, the control logic entry corresponds to the activity of control logic 10 of FIG. 1.

Clock cycle 1 coincides with the receipt of an increment pulse, as shown. Clock cycle 1 advances all of the dayclock modules 0–3. Further, new carry signals are generated for dayclock modules 0–2 as shown, to present to control logic 10. At clock cycle 2, the resulting greater-than and equal-to signals are presented to control logic 10, and advance carry values are presented back to dayclock modules 0–3 as necessary. Subsequent to advancing dayclock modules 0–3, a comparison is performed as shown at clock cycle 2. This comparison is made between the collective dayclock registers and the collective dayclock compare registers, respectively, within each of dayclock modules 0–3. If the control logic determines that the value in the collective dayclock registers equals or exceeds that of the collective dayclock compare registers, a universal processor interrupt (UPI) is issued.

FIG. 3 shows that with the prior art dayclock 8, only three clock cycles are necessary to advance the values of the dayclock registers, perform a comparison of the dayclock and dayclock compare registers, and generate a universal processor interrupt if the value of the dayclock register equals or exceeds that of the dayclock compare register.

FIG. 4 is a block diagram showing the interconnection of four dayclock modules 0–3 in accordance with an exemplary embodiment of the present invention. The diagram is generally shown at 128. As will become apparent below, the dayclock modules 0–3 of FIG. 4 are structurally and functionally different than the prior art dayclock modules 0–3 of FIGS. 1–3.

Dayclock module-3 130 has path 338 as an input and path 232 as an output. Dayclock module-2 132 has path 232 as an input, and path 286 as an output. In addition, dayclock module-2 132 has a universal processor interrupt output on path 234. Dayclock module-1 134 has path 286 as an input and path 332 as an output. Dayclock module-0 136 has path 332 as an input, and path 338 as an output. FIG. 4 shows that each dayclock module requires only two interconnecting paths. In addition, the dayclock modules of the present invention may have all control logic contained therein. Finally, it is recognized that the dayclock modules may be provided on different substrates.

In the exemplary embodiment of the present invention, each dayclock module contains two 9 bit quarter words of a 72-bit dayclock 128. Dayclock module-0 136 may contain the most significant bits, and dayclock module-3 130 may contain the least significant bits of the 72-bit dayclock register. The current dayclock time may be read from dayclock modules 130, 132, 134, and 136 at any time by a corresponding processor or the like via interfaces 211, 213, 215, 217, 219, 221, 223, and 225, respectively. Dayclock modules 3–0 are discussed in further detail with reference to FIGS. 4A–4D, respectively, below.

Figure 4A:
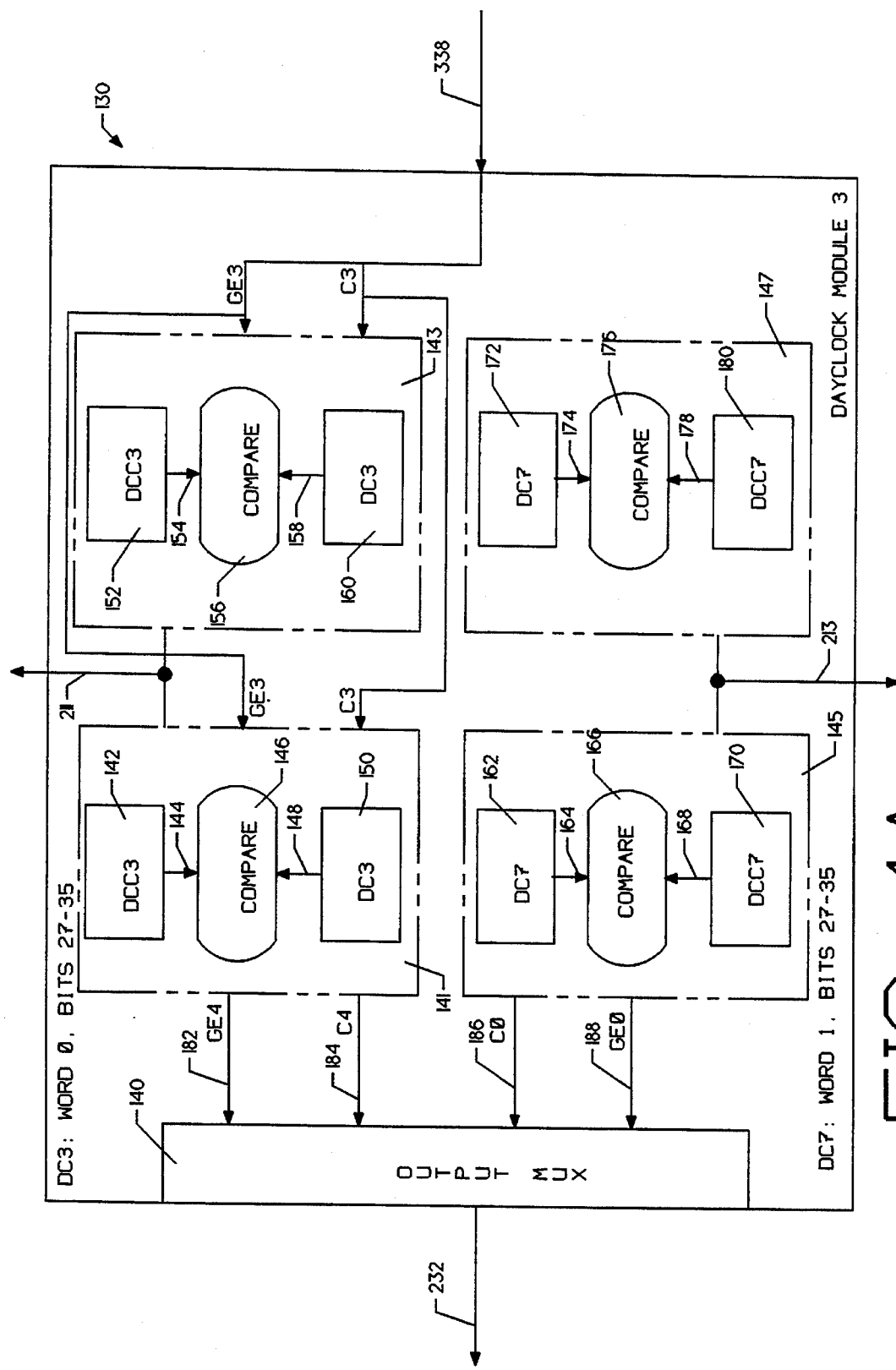
FIG. 4A is a block diagram showing the internal structure of dayclock module-3 of FIG. 4.

FIG. 4A is a block diagram showing the internal structure of dayclock module-3 of FIG. 4. The diagram is generally shown at 130. Dayclock module-3 130 receives a carry signal and a GE signal from dayclock module-0 136 via interface 338. Further, Dayclock 130 may provide a serial time multiplexed carry and GE signal to dayclock module-2 132 via interface 232.

Dayclock module-3 130 may comprise four processing elements 141, 143, 145, and 147 as shown. Each processing element may include a dayclock register, compare block, and compare register. For example, processing element 141 may comprise dayclock register DC3 150, compare register DCC3 142, and compare block 146. Compare block 146 may be coupled to dayclock register DC3 150 via interface 148 and compare register DCC3 142 via interface 144. Processing elements 143, 145, and 147 may be similarly constructed.

In the exemplary embodiment, processing element 143 is identical to processing element 141, thereby providing redundancy thereto. That is, there are two DCC3 registers, and two DC3 registers. Further, processing element 147 is identical to processing element 145, thereby providing redundancy thereto. In the exemplary embodiment, redundant processing elements 143 and 147 are not used.

An increment logic block within processing element 141 (see FIG. 6) may provides a carry signal to the next succeeding module via interface C4 184, if appropriate. Multiplexer 140 may selectively provides either GE4 182, C4 184, C0 186, or GE0 188 to the next succeeding dayclock module in a serial fashion, as discussed in more detail below. The other processing elements 143, 145, and 147 operate in a similar manner.

As is readily apparent, serial communication is used between dayclock modules 130, 132, 134, and 136. For example, as the current dayclock time is incremented in a bit serial fashion, the collective dayclock register value is advanced beginning with the least significant bits stored in data register DC7 162. Depending on the current value stored in the corresponding dayclock register, a carry C0 186 may be provided to dayclock module 132 after incrementation. That is, carry C0 186 may be provided to dayclock module 132 during the next clock cycle wherein it may be used by dayclock module 132 to increment the value of the corresponding counter therein. Thereafter, dayclock module 132 may provide a carry C1 236 to dayclock module-1 134, depending on the current value stored in its corresponding dayclock register (see FIG. 4B and FIG. 4C). This may continue through the path shown in FIGS. 4A–4D. This provides the serial incrementation function in accordance with the present invention.

Referring back to processing element 141 (see FIG. 4A), compare block 146 may compare the values of dayclock compare register DCC3 142 and dayclock register-3 DC3 150 and provide a compare control signal to the next succeeding dayclock module. That is, if the value stored in DC3 150 is greater than or equal to the value stored in DCC3 142, processing element 141 may assert GE4 182. As with the carry signals discussed above, the GE signals may also be provided in a serial fashion through dayclock modules 130, 132, 134, and 136. The sequencing of the carry and GE signals through the processing elements of dayclock modules 130, 132, 134, and 136 is discussed in more detail with reference to FIG. 7.

Finally, the current dayclock time stored in dayclock registers 150 and 160 may be read at any time by a corresponding processor or the like via interface 211. Similarly, the current dayclock time stored in dayclock registers 170 and 180 may be read at any time by a corresponding processor or the like via interface 213. Thus, the incrementation of dayclock registers 150, 160, 170, and 180, as discussed in more detail below, provided during a single clock cycle. This may ensure that a processor or the like reads a fully updated dayclock time value therefrom.

Figure 4B:
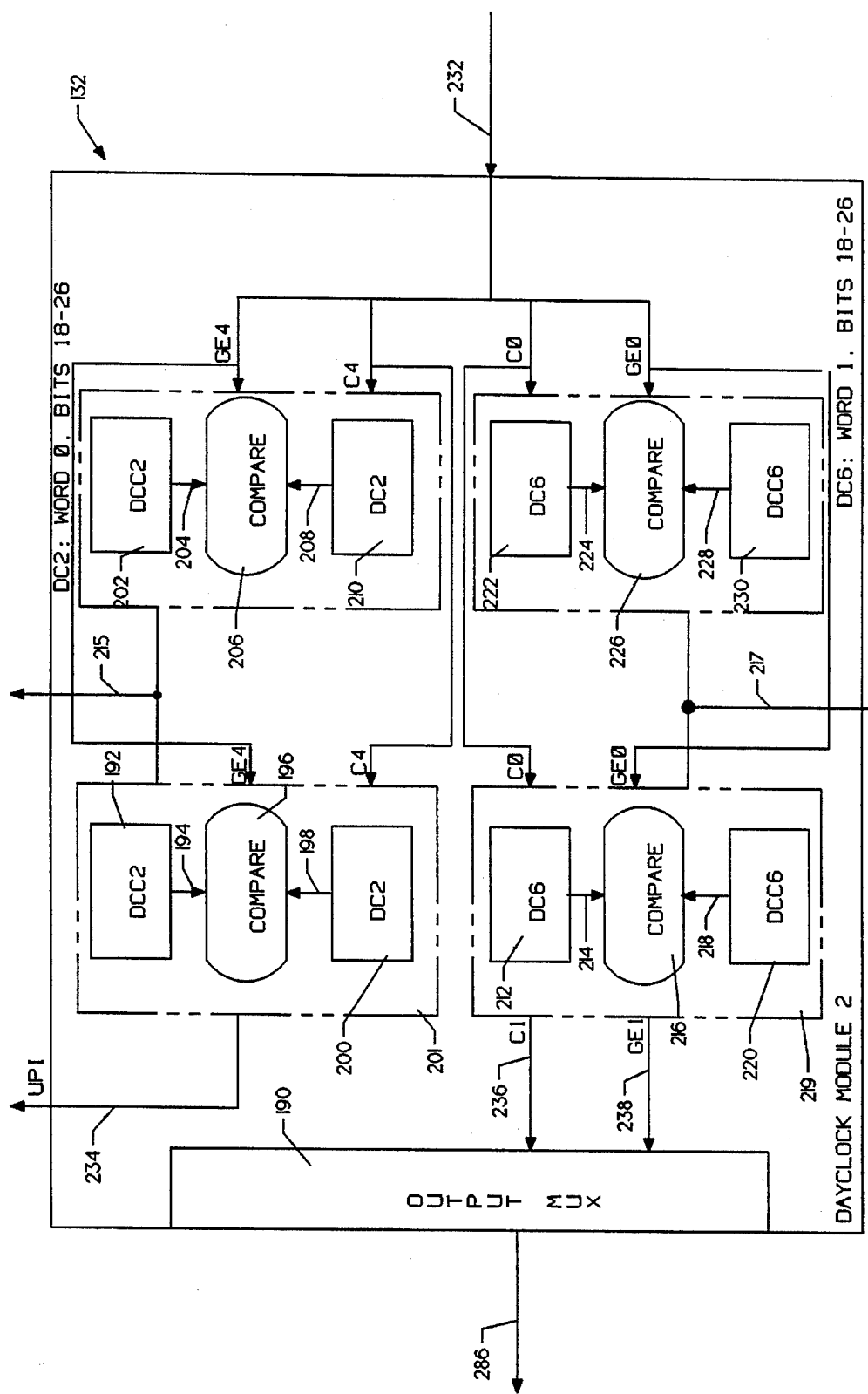
FIG. 4B is a block diagram showing the internal structure of dayclock module-2 of FIG. 4.

FIG. 4B is a block diagram showing the internal structure of dayclock module-2 132 of FIG. 4. The diagram is generally shown at 132. As with dayclock module-3 130 discussed with reference FIG. 4A, dayclock module-2 132 contains four processing elements, two of which are redundant. Further, the operation of dayclock module-2 132 is substantially similar to that discussed with reference to dayclock module-3 130 above. One significant difference is in the generation of the greater-than or equal-to signals. Dayclock modules-3, as described above, simply provides a greater-than or equal-to signal if, for example, the value stored in DC3 150 is greater than or equal to the value stored in DCC3 142. In contrast, dayclock modules 2, 1, and 0 consider the value of the input GE signal provided by the next succeeding lower order dayclock module. For example, dayclock module-2 132 may assert the corresponding greater-than or equal-to signal if the value stored in DC6 212 is greater than the value stored in DCC6 220, or if the value stored in DC6 212 is equal to the value stored in DCC6 220 and the corresponding GE input signal 232 provided by dayclock module-3 130 is asserted.

Dayclock module-2 132 further provides a universal processor interrupt signal via interface 234. That is, in the exemplary embodiment, processing element 201 is the highest order processing element and receives the carry and GE signals from the second highest processing element 141 (see FIG. 4A). Thus, processing element 201 does not provide a carry signal, as do all other utilized processing elements within the system. Further, rather than providing a GE signal to a next succeeding dayclock module, processing element 201 selectively provides a universal processor interrupt signal to the data processing system. That is, if each of the participating processing elements in the serial chain provide a GE signal to the next succeeding element, processing element 201 may provide the universal processor interrupt signal. It is contemplated that the universal processor interrupt signal may be generated using the same logic as the other GE signals within the system. This enhances the modularity of the dayclock modules, because each dayclock module is capable of generating the universal processor interrupt signal and the GE signal.

Finally, the current dayclock time stored in dayclock registers 200 and 210 may be read at any time by a corresponding processor or the like via interface 215. Similarly, the current dayclock time stored in dayclock registers 220 and 230 may be read at any time by a corresponding processor or the like via interface 217. As indicated above, the incrementation of dayclock registers 200, 210, 220, and 230, as discussed in more detail below, is provided during a single clock cycle. This may ensure that a processor or the like reads a fully updated dayclock time value therefrom.

Figure 4C:
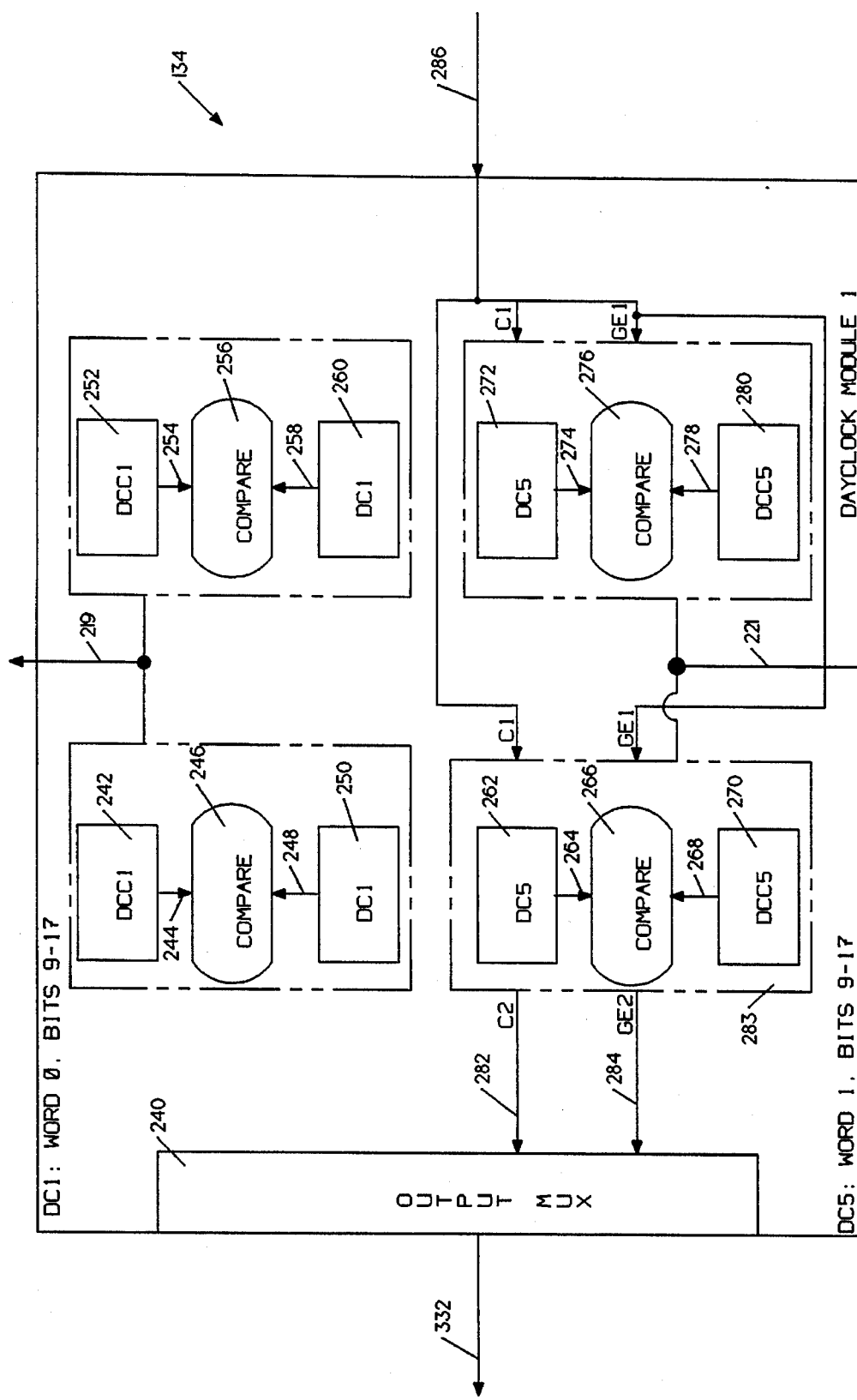
FIG. 4C is a block diagram showing the internal structure of dayclock module-1 of FIG. 4.

FIG. 4C is a block diagram showing the internal structure of dayclock module-1 of FIG. 4. The diagram is generally shown at 134. Dayclock module-1 134 is substantially similar to Dayclock modules-2 and dayclock module-3 discussed with reference to FIGS. 4A–4B. However, in the exemplary embodiment, only processor element 283 is directly utilized.

As indicated above, the current dayclock time stored in dayclock registers 250 and 260 may be read at any time by a corresponding processor or the like via interface 219. Similarly, the current dayclock time stored in dayclock registers 270 and 280 may be read at any time by a corresponding processor or the like via interface 221. As indicated above, the incrementation of dayclock registers 250, 260, 270, and 280, as discussed in more detail below, is provided during a single clock cycle. This may ensure that a processor or the like reads a fully updated dayclock time value therefrom.

Figure 4D:
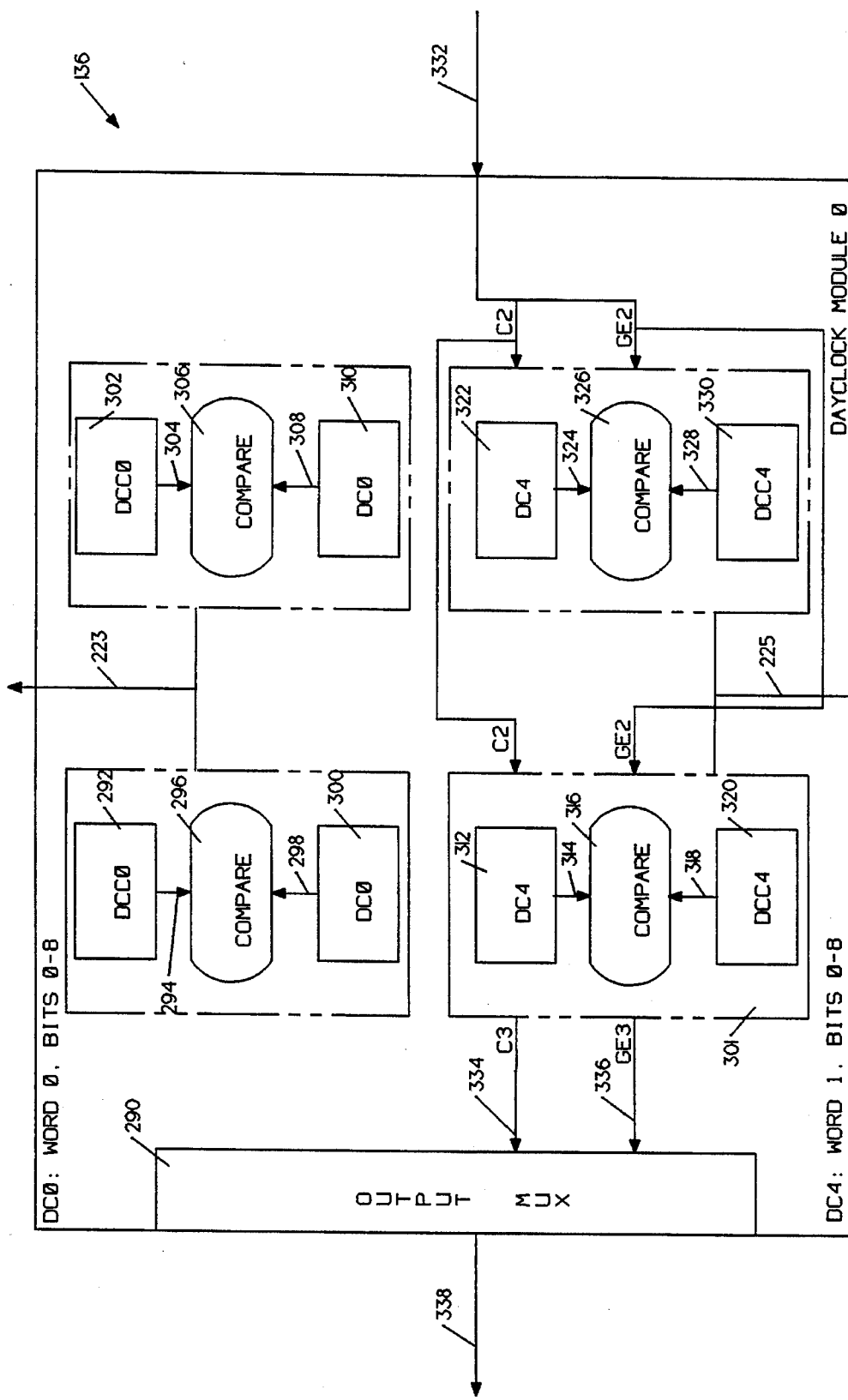
FIG. 4D is a block diagram showing the internal structure of dayclock module-0 of FIG. 4.

FIG. 4D is a block diagram showing the internal structure of dayclock module-0 of FIG. 4. The diagram is generally shown at 136. Dayclock module-0 136 is substantially similar to dayclock modules-3 130, dayclock module-2 132, and dayclock module-1 134 discussed with reference to FIGS. 4A–4C, respectively. However, in the exemplary embodiment, only processor element 301 is directly utilized.

The current dayclock time stored in dayclock registers 300 and 310 may be read at any time by a corresponding processor or the like via interface 223. Similarly, the current dayclock time stored in dayclock registers 312 and 322 may be read at any time by a corresponding processor or the like via interface 225. As indicated above, the incrementation of dayclock registers 300, 310, 312, and 322 is provide during a single clock cycle, thereby ensuring that a processor or the like reads a fully updated dayclock time value therefrom.

It is contemplated that dayclock register DC7 172 stores word one bits 27–35 (see FIG. 4A), DC6 222 stores word one bits 18–26 (see FIG. 4B), DC5 272 stores word one bits 9–17 (see FIG. 4C), and DC4 312 stores word one bits 0–8 (see FIG. 4D). Further, it is contemplated that DC3 160 stores word zero bits 27–35 (see FIG. 4A), and DC2 200 stores word zero bits 18–26 (see FIG. 4B) of the 72-bit dayclock value.

As indicated above, dayclock 128 is advanced in a bit serial fashion. For example, during a first clock cycle, C0 is clocked from processing element 145 of dayclock module-3 130 to processing element 219 of dayclock module-2 132 via output mux 140 and interface 232 (see FIGS. 4A–4B). C0 is used to calculate the next carry C1 on path 236. During a next clock cycle, C1 is clocked into dayclock module-1 134 via output mux 190 and interface 286 (see FIGS. 4B–4C). C1 is used to calculate the next carry C2 on path 282. This bit serial clocking may continue until a corresponding carry signal is provided to processing element 201 of dayclock module-2 132 (see FIGS. 4A–4D). In the exemplary embodiment, where the dayclock counter is architecturally defined as comprising 52 bits, this requires a total of five clock cycles (see FIG. 7). On the sixth clock cycle, all dayclock registers are advanced. That is, the new computed time is transferred, in a parallel fashion, from the increment logic block within each processing element back to the corresponding dayclock registers (see FIG. 6).

Figure 7:
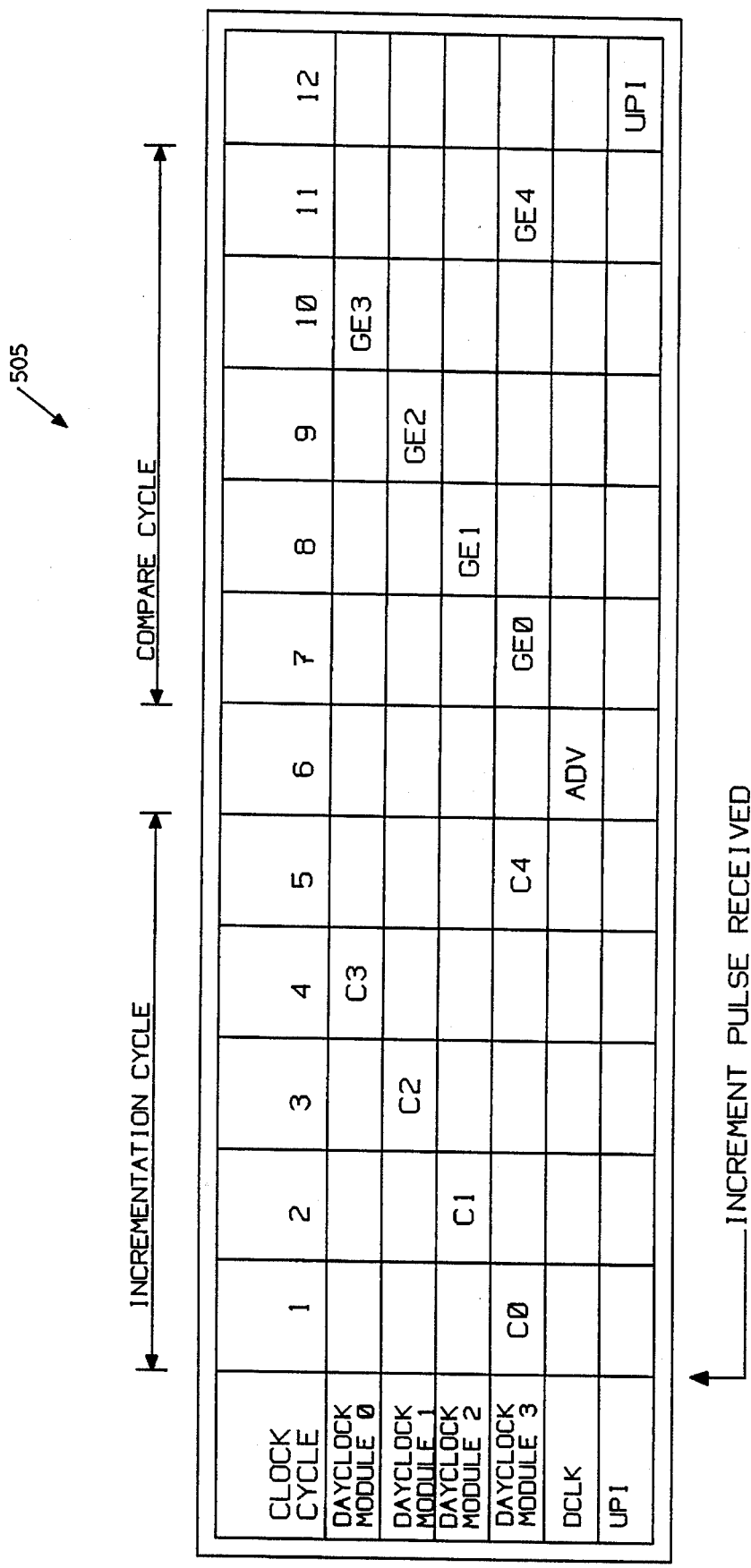
FIG. 7 is a timing diagram showing counter incrementation and compare for the exemplary embodiments of FIG. 4 and FIG. 5.

After the dayclock value has been advanced, the same type of bit serial sequencing is performed to compare the dayclock and dayclock compare values. The comparison begins with the least significant dayclock quarter word contained in DC7 162 (see FIG. 4A). Compare 166 compares the dayclock bits stored in DC7 162 and the compare bits stored in DCC7 170, and asserts GE0 188 if the value in DC7 162 is greater than or equal to the value stored in DCC7 170. This result is clocked into processing element 219 of dayclock module-2 132 via output mux 140 and interface 232 as shown. This may occur on the seventh clock cycle as shown in FIG. 7. The GE0 signal on interface 232 is used along with the values stored in DC6 212 and DCC6 220, to calculate greater-than-or-equal-to GE1 238 (see FIG. 4B). GE1 is clocked through output mux 190 to dayclock module-1 134. This may occur on the eighth clock cycle as shown in FIG. 7. This sequence may continue until processing element 201 receives GE4 via interface 232 (see FIGS. 4A–4D).

Figure 5:
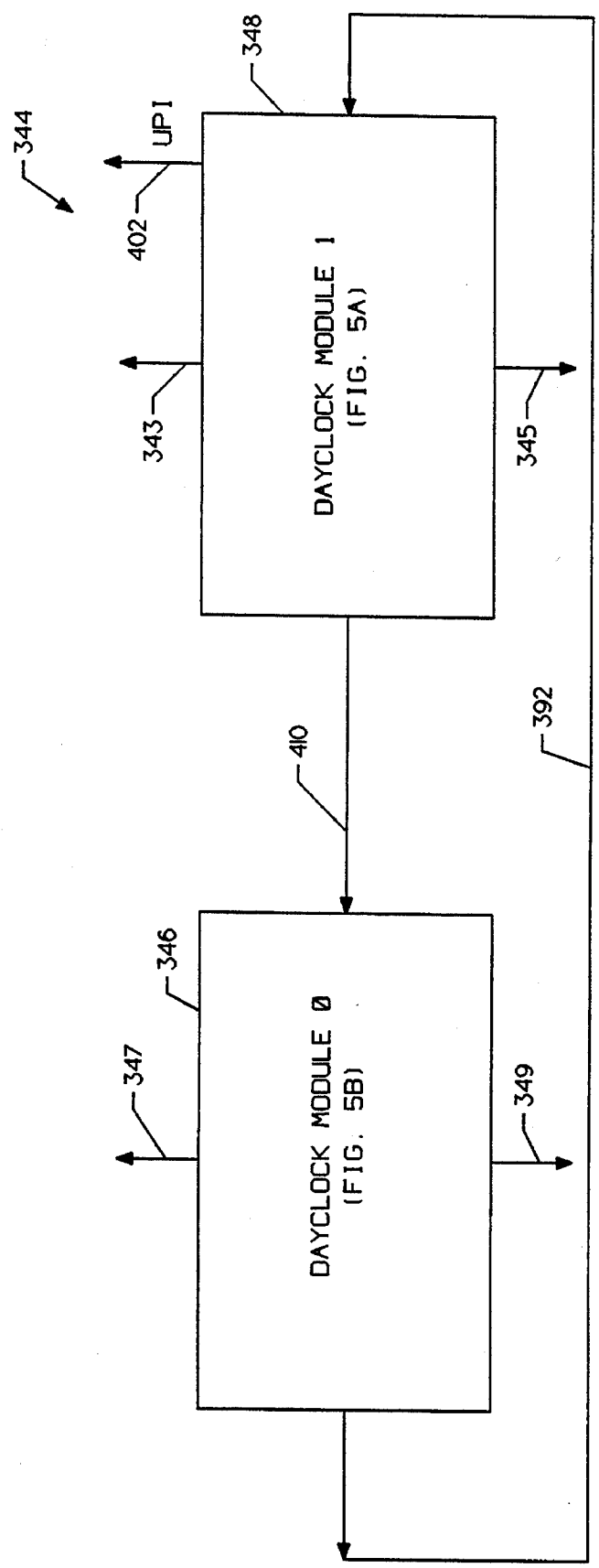
FIG. 5 is a block diagram showing an alternative embodiment of the present invention comprising dayclock modules 0-1.

As indicated above, processing element 201 does not provide a GE signal to a next succeeding dayclock module, but rather selectively provides a universal processor interrupt signal on interface 234. The universal processor interrupt signal is asserted to indicate that the collective count value of the 52-bit dayclock counter field of the 72 bit dayclock register is equal to or greater than the collective compare value retained in the corresponding 52-bit dayclock compare field of the 72 bit dayclock compare register. As can readily be seen, a universal processor interrupt may be provided in 12 clock cycles after the beginning of an incrementation cycle (see FIG. 7). In the exemplary embodiment, the 72-bit dayclock register includes two field. The first field is 20 bits in length including bits 0–19 of word-0, and is always loaded with a value of zero via the instruction processor or the like. The second field is 52 bits in length and contains the current dayclock time value. The contents of the dayclock register are architecturally undefined if the dayclock counter overruns the 52-bit field. FIG. 5 is a block diagram showing an alternative embodiment of the present invention comprising dayclock modules 0–1. The diagram is generally shown at 344. Here, dayclock module-0 346 and dayclock module-1 348 are equivalent in function to the dayclock modules 0–4 as shown in FIG. 4 and FIG. 4A–4D, except that the internal interconnection of the individual dayclock elements is different. Further, no redundancy is provided to reduce the hardware requirements.

Dayclock module-1 348 has path 392 as an input and path 410 as an output. In addition, dayclock module-348 has path 402 as a universal processor interrupt output. Dayclock module-0 346 has path 410 as an input, and path 392 is an output. Dayclock module-0 and dayclock module each have only one input and one output to support dayclock incrementation and compare, as the clocking of the carry and greater-than-or-equal-to signals is performed in a bit serial fashion. It is contemplated that the current dayclock time may be read from dayclock module-0 346 at any time by a corresponding processor or the like via interfaces 347 and 349. Further, it is contemplated that the current dayclock time may be read from dayclock module-1 348 at any time by a corresponding processor or the like via interfaces 343 and 345.

Figure 5A:
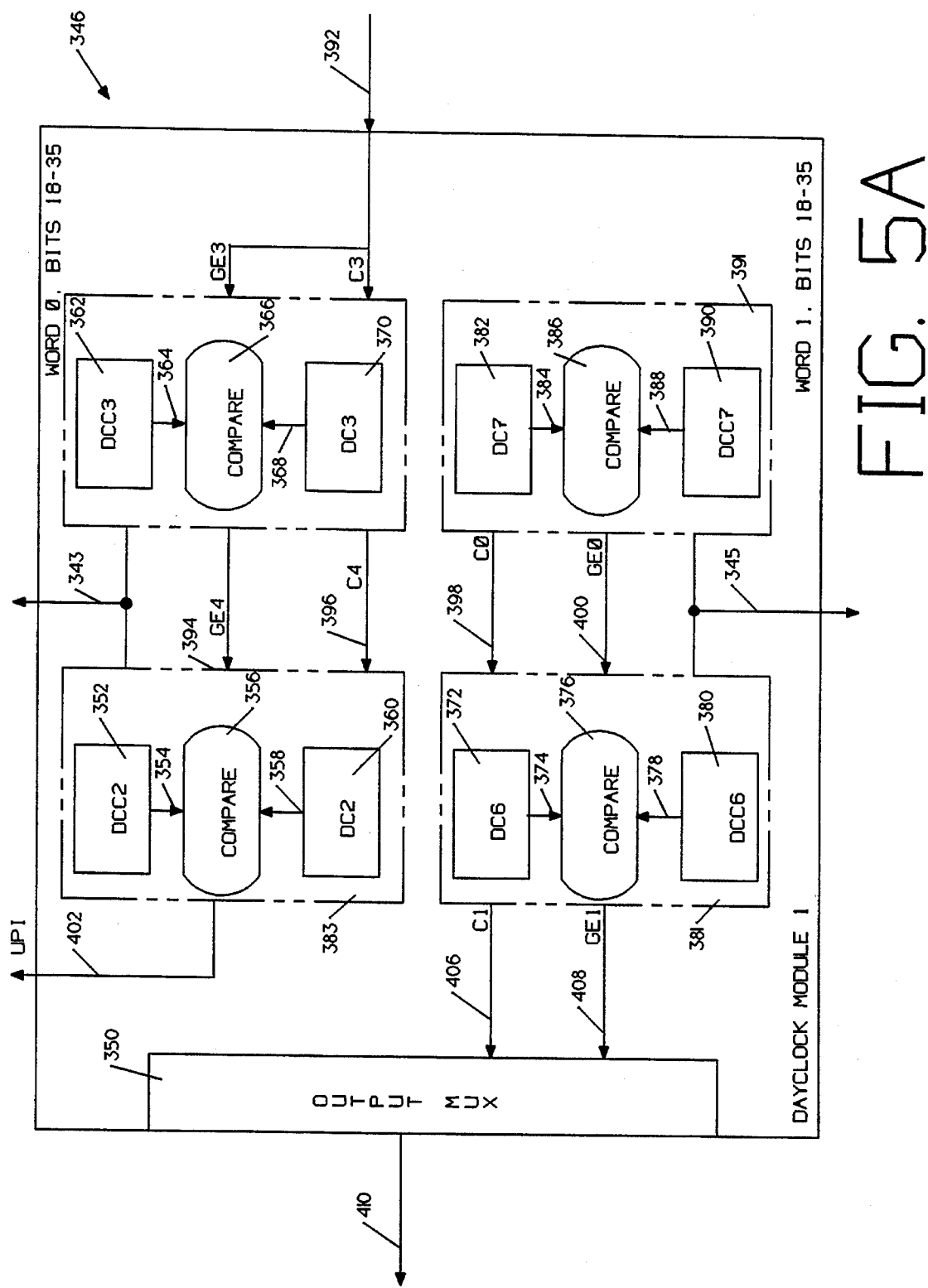
FIG. 5A is a block diagram showing the internal function of dayclock module-1 of FIG. 5.

FIG. 5A is a block diagram showing the internal function of dayclock module-1 of FIG. 5. The diagram is generally shown at 346. Dayclock module-1 346 is substantially similar to dayclock modules-3 130, dayclock module-2 132, dayclock module-1 134, and dayclock module-0 136 discussed with reference to FIGS. 4A–4D, respectively. As indicated above, the incrementation of dayclock registers 360, 370, 372, and 382 is provide during a single clock cycle, thereby ensuring that a processor or the like reads a fully updated dayclock time value therefrom.

Figure 5B:
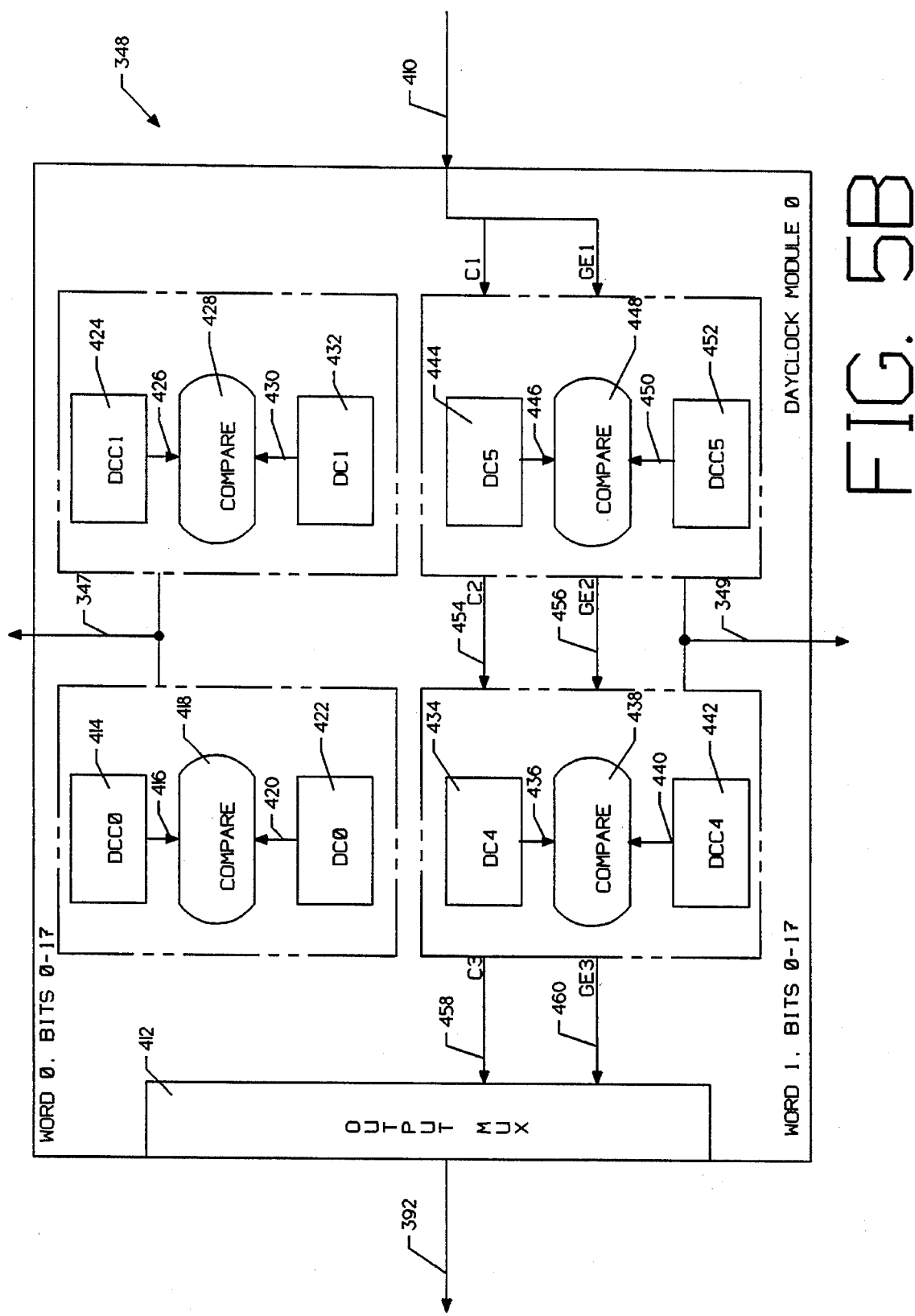
FIG. 5B is a block diagram showing the internal function of dayclock module-0 of FIG. 5.

FIG. 5B is a block diagram showing the internal function of dayclock module-0 of FIG. 5. The diagram is generally shown at 348. Dayclock module-0 348 is substantially similar to dayclock modules-3 130, dayclock module-2 132, dayclock module-1 134, and dayclock module-0 136 discussed with reference to FIGS. 4A–4D, respectively. As indicated above, the incrementation of dayclock registers 422, 432, 434, and 444 is provide during a single clock cycle, thereby ensuring that a processor or the like reads a fully updated dayclock time value therefrom.

It is contemplated that dayclock register DC7 382 and DC6 372 store word one bits 18–35 (see FIG. 5A), DC5 444 and DC4 434 store word one bits 0–17 (see FIG. 5B). Further, DC3 370 and DC2 360 store word zero bits 18–35 (see FIG. 5A), and DC1 432 and DC0 422 store word zero bits 0–17 (see FIG. 5B) of the 72-bit dayclock value. In the exemplary embodiment, the dayclock time value stored in DC1 432 and DC0 422 is not incremented as shown.

It is contemplated that the operation of the alternate embodiment shown in FIG. 5 is substantially similar to that discussed with reference to FIG. 4 above. That is, during a first clock cycle, the first carry C0 is provided from processing element 391 to processing element 381. C0 is then used with the values stored in DC6 372 and DCC6 380 to calculate the next carry C1 (see FIG. 5A). This bit serial advancement may continue until the last carry signal C4 is provided to processing element 383 (see FIGS. 5A–5B). In the exemplary embodiment, this requires a total of five clock cycles (see FIG. 7). On the sixth clock cycle, all dayclock registers are advanced. That is, the new computed dayclock time is transferred, in a parallel fashion, from the increment logic block within each processing element to the corresponding dayclock registers (see FIG. 6).

After the dayclock value has been advanced, the same type of bit serial sequencing is performed to compare the dayclock bits and dayclock compare bits. The comparison begins with the least significant dayclock quarter word contained in DC7 382 (see FIG. 5A). Compare 386 compares the values of the dayclock bits stored in DC7 382 and compares bits stored in DCC7 390, and asserts a GE0 signal on interface 400 if the value in DC7 382 is greater than or equal to the value stored in DC7 390. The result is clocked into processing element 381 of dayclock module-1 346 via interface 400 as shown (see FIGS. 5A–5B). In the exemplary embodiment, this may occur on the seventh clock cycle as shown in FIG. 7.

The GE0 signal on interface 400 is used along with the values stored in DC6 372 and DCC6 380 to calculate GE1 on interface 408 (see FIG. 5B). GE1 is clocked through output mux 350 to dayclock module-0 348. This may occur on the eighth clock cycle as shown in FIG. 7. This sequence may continue until processing element 383 receives GE4 via interface 394 (see FIGS. 5A–5D).

As indicated above, processing element 383 does not provide a GE signal to a next succeeding dayclock module, but rather selectively provides a universal processor interrupt signal on interface 402. The universal processor interrupt signal is asserted to indicate that the collective count of the 52-bit dayclock counter field is equal to or greater than the collective compare value retained in the 52-bit dayclock compare field. As can readily be seen, a universal processor interrupt may be provided in 12 clock cycles or less after the beginning of an incrementation cycle (see FIG. 7).

Figure 6:
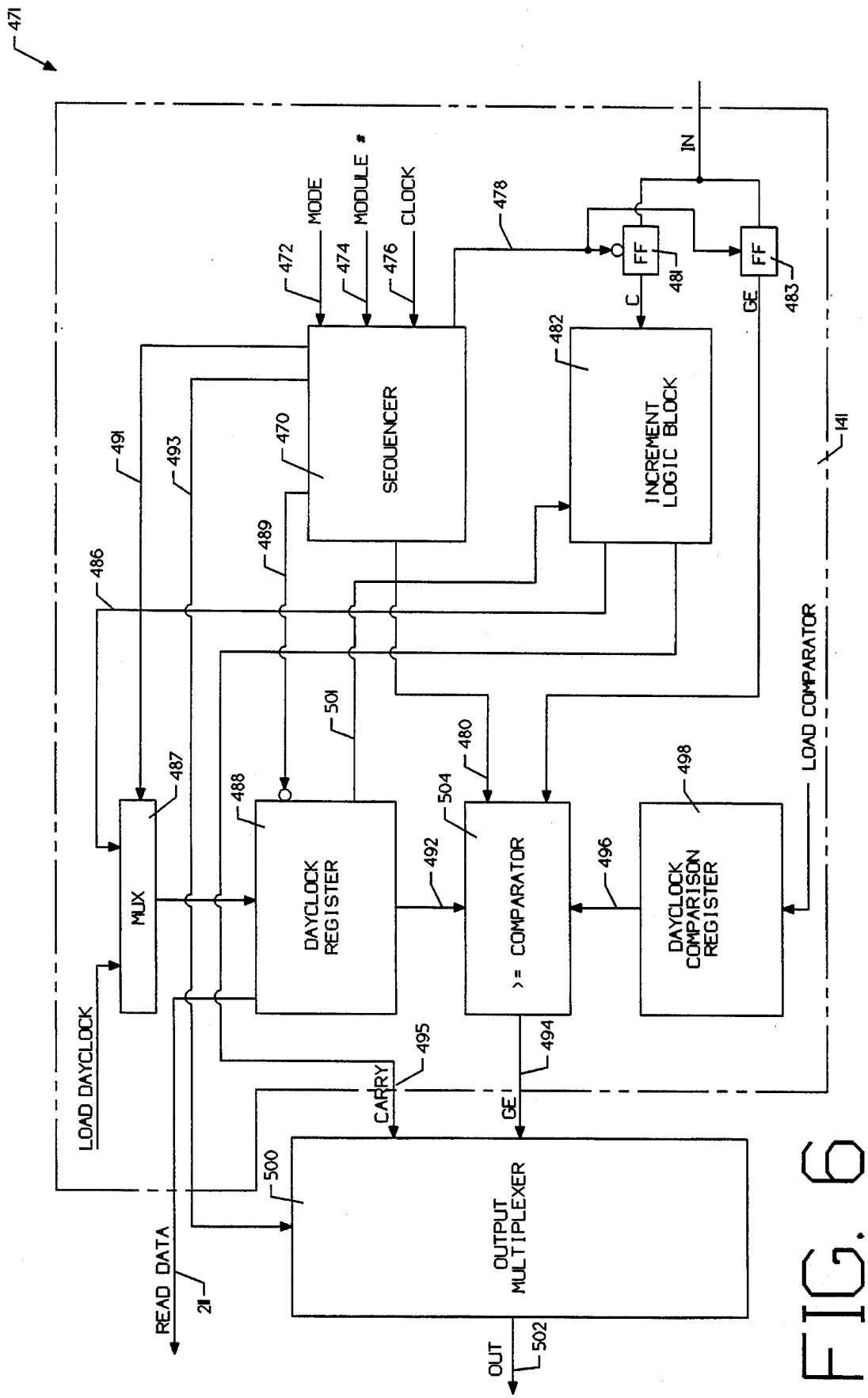
FIG. 6 is a schematic diagram showing a dayclock element in accordance with an exemplary embodiment of the present invention.

FIG. 6 is a schematic diagram showing a processing element in accordance with an exemplary embodiment of the present invention. The diagram is generally shown at 471. It is contemplated that each processing element may include a dayclock register 488 for storing a portion of the 72 bit dayclock time value, a comparison register 498 for storing a portion of the 72 bit dayclock compare value, a comparator 504 for comparing the value of the dayclock bits stored in the dayclock register 488 and the value of the compare bits stored in comparison register 498, and an increment logic block 482 for computing a new increment value within each processing element, based on the current dayclock value and the carry-in value stored in register 481. Further, each processing element may include a multiplexer 487 for providing a mechanism to load an initial value into increment register 488, a sequencer 470 for controlling the operation of each processing element, and a pair of registers 481 and 483 for synchronizing the carry and GE signals. Finally, each dayclock module may include an output multiplexer 500 for serially multiplexing the carry and GE signals to the next succeeding dayclock module.

In the exemplary embodiment, sequencer 470 has a mode input 472, a module # input 474, and a clock input 476. Sequencer 470 provides control signals to increment counter 482 via interface 478, to comparator 504 via interface 480, to increment register 488 via interface 489, to input multiplexer 487 via interface 491, and to output multiplexer 500 via interface 493. The mode input 472 may be used to select between the configurations shown in FIG. 4 and FIG. 5. The module # input 474 may designate the position of the particular dayclock module within the 72-bit dayclock. The clock input 476 may be used to synchronize the operation of the dayclock modules.

For illustrative purposes, only processing element 141 of FIG. 4A is shown. However, it is recognized that the other processing elements may be similarly constructed. Processing element 141 may receive a carry signal C3 from dayclock module-0 136 via interface 338 (see FIG. 4A and FIG. 4D). Further, processing element 141 may receive a signal GE3 from dayclock module-0 136 via interface 338 (see FIG. 4A and FIG. 4D). Sequencer 470 may enable register 481 when the dayclock module is in an incrementation cycle, and may enable register 483 when the dayclock module is in a comparing cycle (see FIG. 7).

Periodically via an instruction processor or the like, a predetermined dayclock compare value comprising a number of compare bits may be loaded into comparison register 498. Further, a predetermined initial dayclock time comprising a number of dayclock bits may be loaded into dayclock register 488 via multiplexer 487, and passed to increment logic block 482 via interface 501.

As indicated above, during the incrementation cycle, sequencer 470 may enable register 481 thereby capturing the C4 signal therein. Increment logic block 482 transfer a value back to the dayclock register via interface 486 and multiplexer 487, depending on the logic value of the carry signal stored in register 481. If the carry signal is a logic "1", the value transferred to the dayclock register is equal to the current value of the dayclock register +1. If the carry signal is a logic "0", the value transferred to the dayclock register by increment logic block 482 is equal to the current value of the dayclock. Further, increment logic block 482 may provide a carry signal to output multiplexer 500 via interface 495, which then may be provided to the next succeeding dayclock module.

In the exemplary embodiment, the carry signal C4 may arrive at processing element 141 during the fifth clock cycle (see FIG. 7). It is clocked into the carry register 481 by the control signal 478 from sequencer 470. Sequencer 470 also directs output multiplexer 500 to provide the carry signal on interface 495 during the incrementation cycle.

On the sixth clock cycle, the value presented by increment logic block 482 may be transferred to dayclock register 488.

That is, sequencer 470 may direct multiplexer 487 to select the output of increment logic block 482, and enable dayclock register 488 via interface 489. It is contemplated that the value presented by the increment logic block 482 may be provided to dayclock register 488 in a parallel fashion. As indicated above, a processor or the like may read the dayclock time value stored in dayclock register 488 at any time, via interface 211. Thus, it may be important to update the dayclock register 488 in a parallel fashion to ensure that the most current dayclock value is provided thereto.

During the compare cycle, sequencer 470 may disable register 481 and enable register 483, wherein register 483 may capture the GE4 signal from the previous dayclock module. The GE4 signal may be provided to comparator 504 and may be used to calculate the next succeeding GE signal. For processing element 141, sequencer 470 may enable comparator 504 during the eleventh cycle as shown in FIG. 7. Comparator 504 compares the dayclock time value stored in increment register 488 with the comparison value stored in comparison register 498. If the dayclock time value is greater than or equal to the comparison value, and if the greater than signal GE4 is asserted, comparator 504 asserts the GE signal on interface 494. Sequencer 470 directs output multiplexer 500 to provide the GE signal on interface 494 to the next succeeding dayclock module.

FIG. 7 is a timing diagram showing counter incrementation for the exemplary embodiments of FIG. 4 and FIG. 5. The diagram is generally shown at 505. The dayclock module entries in the first column correspond to dayclock module-0 136, dayclock module-1 134, dayclock module-2 132 and dayclock module-3 130. The entry DCLK refers to dayclock time value, and illustrates that each quarter word of the dayclock is advanced at the same time, during clock cycle 6. The UPI entry illustrates the earliest possible clock cycle the universal processor interrupt may be issued after the dayclock is advanced.

Clock cycle 1 corresponds to the receipt of the increment pulse which is used to begin the sequencing. Upon receipt of the increment pulse, C0 is provided by processing element 145 of dayclock module-3 130. During clock cycle 2, C1 is provided by processing element 219 of dayclock module-2 132. Carry signals C2, C3 and C4 are similarly provided during clock cycles 3–5, respectively, in a bit serial fashion. Clock cycles 1–5 are collectively referred to as the incrementation cycle.

At clock cycle 6, all dayclock modules are advanced such that counter values computed by the increment logic block and based on the previous dayclock value and the resultant carry that was sequentially propagated and stored in the carry register are provided to the corresponding dayclock registers as described with reference to FIG. 6. This transfer is performed in parallel, and thus is completed within one clock cycle.

After the dayclock is advanced, the same type of bit serial sequencing is performed to compare the values of the dayclock bits stored in the dayclock increment registers with the values of the compare bits stored in the dayclock compare registers. This is accomplished during clock cycles 7–11. Clock cycles 7–11 are collectively referred to as the compare cycle. If the value stored in the dayclock registers equals or exceeds that of the dayclock compare registers, a universal processor interrupt is issued during clock cycle 12.

FIG. 8 is a table showing the allocation of the dayclock register across the dayclock modules of the exemplary embodiments shown in FIG. 4 and FIG. 5. The diagram is generally shown at 507. FIG. 8 illustrates that for both embodiments, the same total number of dayclock register bits are utilized for storing the current dayclock time. In the embodiment shown in FIG. 4, dayclock module-0 136 contains bits 0–8 of words 0 and 1, dayclock module-1 contains bits 9–17 of words 0 and 1, dayclock module-2 contains bits 18–26 of words 0 and 1, and dayclock module-3 contains bits 27–35 of words 0 and 1. In the embodiment shown in FIG. 5, dayclock module-0 contains bits 0–17 of words 0 and 1, and dayclock module-1 contains bits 18–35 of words 0 and 1, thus maintaining the same total dayclock size.

For the embodiment shown in FIG. 5, fewer carrys are routed between dayclock modules. For example, for the embodiment shown in FIG. 4, C0 is routed from dayclock module-3 130 to dayclock module-2 132. In contrast, the C0 signal of the embodiment shown in FIG. 5 is routed to DC6 372 within dayclock module-1 346. The advantage of the embodiment shown in FIG. 4 is that full redundancy may be provided. The advantage of the embodiment shown in FIG. 5 is that the number of routing channels and I/O pins may be reduced.

It is contemplated that if all 72 bits are not required for a particular application, the upper most significant bits as necessary can be loaded with zeros and not incremented thereafter. For example, dayclock 128 as shown in FIG. 4 does not utilize word 0, bits 9–17 of dayclock module-1 134 or word 0 bits 0–8 of dayclock module-0 136. Also, dayclock 344 does not utilize word 0, bits 0–17 of dayclock module-0 348.

Figure 9:
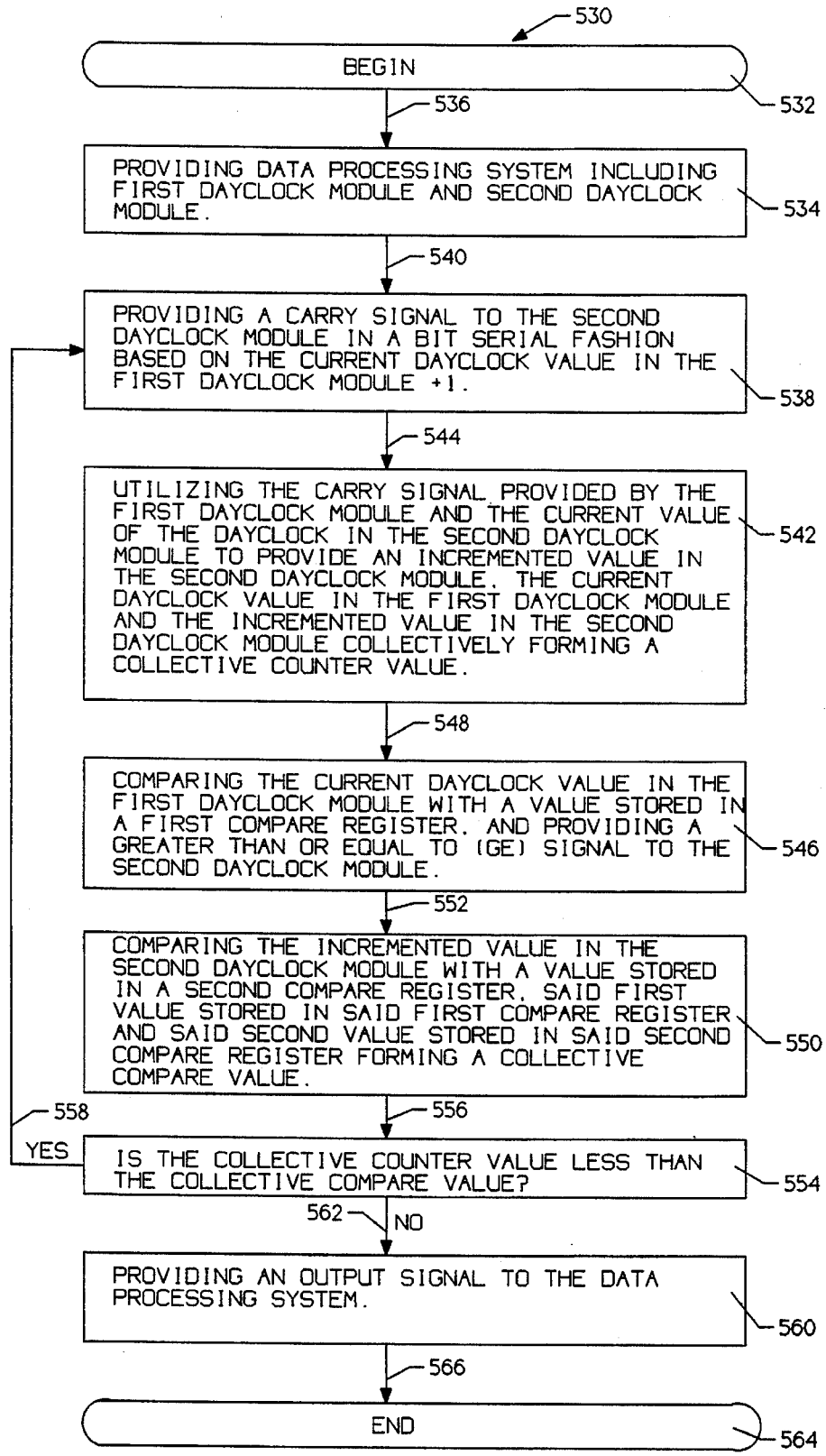
FIG. 9 is a flow diagram showing a first exemplary method of the present invention.

FIG. 9 is a flow diagram showing a first exemplary method of the present invention. The diagram is generally shown at 530. The algorithm is entered at element 532, wherein control is passed to element 534 via interface 536. Element 534 provides a data processing system including a first dayclock module and a second dayclock module. Control is then passed to element 538 via interface 540. Element 538 provides a carry signal to the second dayclock module in a bit serial fashion. Control is then passed to element 542 via interface 544. Element 542 provides a carry signal back to the first dayclock module. The stored carry values that were propagated, plus the current values stored in the dayclock register are used by the increment logic block to calculate a new value that collectively forms the new dayclock value that is loaded into the dayclock registers of the first and second dayclock modules.

Control is then passed to element 546 via interface 548. Element 546 compares the value stored in the first dayclock register with the value stored in a first compare register, and selectively provides a greater than or equal to (GE) signal to the second dayclock module in a bit serial fashion. Control is then passed to element 550 via interface 552. Element 550 compares the value stored in the second dayclock register with a value in a second compare register. The first value stored in the first compare register and a second value stored in the second compare register form a collective compare value. Control is then passed to element 554 via interface 556.

Element 554 determines whether the collective counter value is less than the collective compare value. If the collective dayclock value is less than the collective compare value, control is passed back to element 538 via interface 558. If, however, the collective dayclock value is greater than or equal to the collective compare value, control is passed to element 560 via interface 562. Element 560 provides an output signal to the data processing system. In an exemplary embodiment, this output signal may comprise a universal processor interrupt signal. Control is then passed to element 564 via interface 566, wherein the algorithm is exited.

Figure 10:
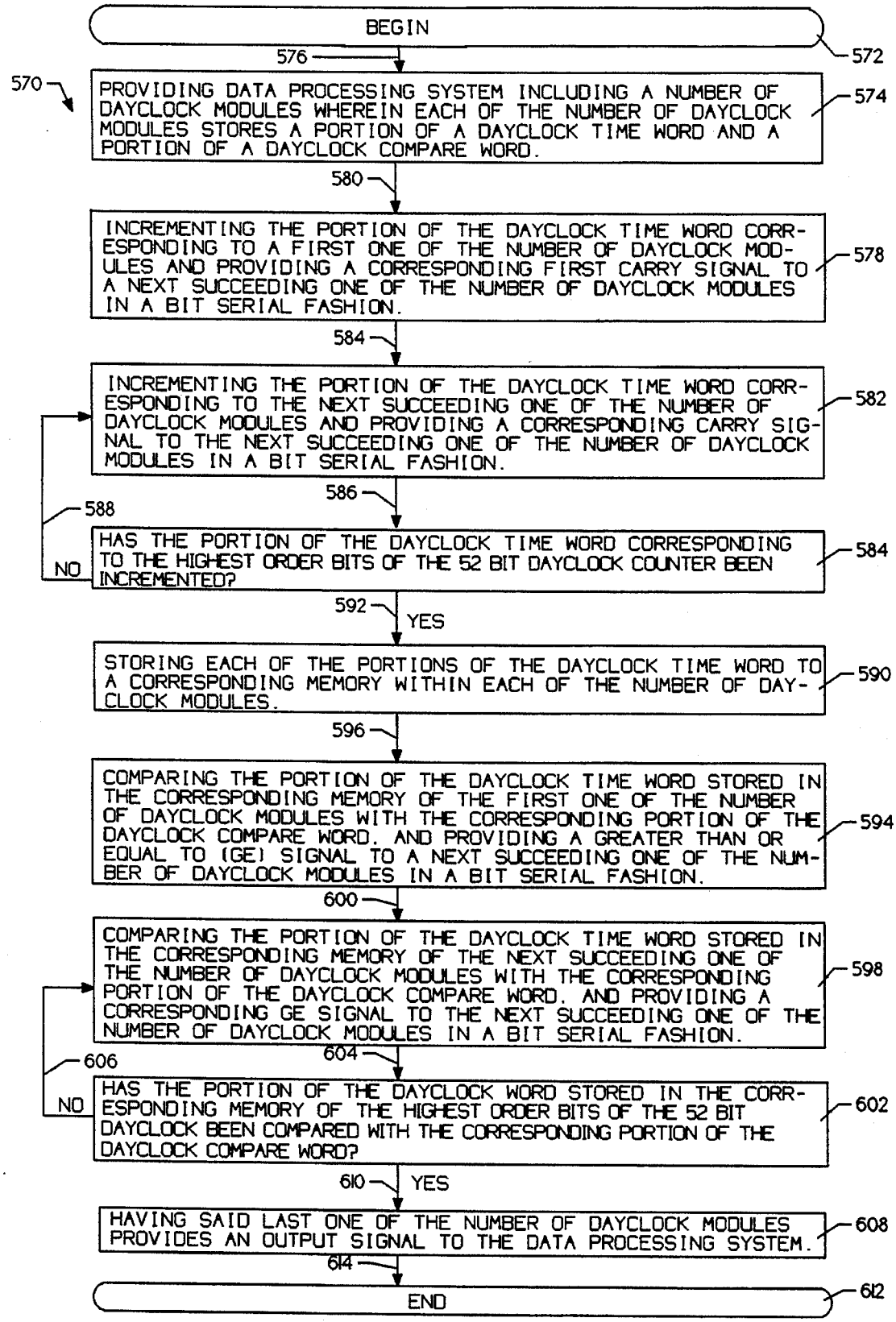
FIG. 10 is a flow diagram showing a second exemplary method of the present invention.

FIG. 10 is a flow diagram showing a second exemplary method of the present invention. The diagram is generally shown at 570. The algorithm is entered at element 572, wherein control is passed to element 574 via interface 576. Element 574 provides a data processing system which includes a number of dayclock modules wherein each of the number of dayclock modules stores a portion of a dayclock time word and a portion of a dayclock compare word. Control is then passed to element 578 via interface 580.

Element 578 increments the portion of the dayclock time word that corresponds to the first one of the number of dayclock modules, and selectively provides a corresponding first carry signal to a next succeeding one of the number of dayclock modules in a bit serial fashion. Control is then passed to element 582 via interface 584. Element 582 increments the portion of the dayclock time word corresponding to the next succeeding one of the number of dayclock modules, and selectively provides a corresponding carry signal to the next succeeding one of the number of dayclock modules, in a bit serial fashion. Control is then passed to element 584 via interface 586.

Element 584 determines whether the portion of the dayclock time corresponding to the highest order bits of the 52 bit counter has been incremented. If the portion of the dayclock time word corresponding to the highest order bits of the 52 bit counter has not been incremented, control is passed back to element 582 via interface 588.

If the portion of the dayclock time word that corresponds to the highest order bits of the 52 bit counter has been incremented, control is passed to element 590 via interface 592. Element 590 stores each of the portions of the dayclock time in a corresponding memory within each of the number of dayclock modules. Control is then passed to element 594 via interface 596.

Element 594 compares the portion of the dayclock time word stored in the corresponding memory of the first one of the number of dayclock modules with the corresponding portion of the dayclock compare word. Element 594 further selectively provides a greater than or equal to (GE) signal to a next succeeding one of the number of dayclock modules in a bit serial fashion. Control is then passed to element 598 via interface 600. Element 598 compares the portion of the dayclock time word stored in the corresponding memory of the next succeeding one of the number of dayclock modules with the corresponding portion of the dayclock compare word. Further, element 598 selectively provides a corresponding GE signal to the next succeeding one of the number of dayclock modules, in a bit serial fashion. Control is then passed to element 602 via interface 604. Element 602 determines whether the portion of the dayclock time word stored in the corresponding memory of the highest order bits of the 52 bit dayclock has been compared with the corresponding portion of the dayclock compare word. If the portion of the dayclock time word stored in the corresponding memory of the highest order bits of the 52 bit dayclock has not been compared with the corresponding portion of the dayclock compare word, control is passed back to element 598 via interface 606.

If, however, the portion of the dayclock time word stored in the corresponding memory of the highest order bits of the 52 bit dayclock has been compared with the corresponding portion of the dayclock compare word, control is passed to element 608 via interface 610. Element 608 provides an output signal from the highest order one of the number of dayclock modules to the data processing system. In an exemplary embodiment, the output signal may be a universal processor interrupt signal. Control is then passed to element 612 via interface 614, wherein the algorithm is exited.

Having thus described the preferred embodiments of the present invention, those of skill in the art will readily appreciate that the teachings found herein may be applied to yet other embodiments within the scope of the claims hereto attached.

What is claimed is:

1. A modular dayclock system for maintaining a dayclock time in a data processing system wherein the dayclock time is stored as a number of dayclock bits and wherein a predetermined elapse time is stored as a number of compare bits, comprising:
   a. a number of dayclock modules wherein each of the number of dayclock modules stores a predetermined number of the dayclock bits and stores a predetermined number of the compare bits;
   b. advancing means coupled to said number of dayclock modules for advancing the dayclock time by altering the number of dayclock bits in each of the number of dayclock modules according to a predetermined scheme, said advancing means providing a predetermined advance control signal between predetermined ones of the number of dayclock modules wherein the predetermined advance control signal is transmitted between the predetermined ones of the number of dayclock modules in a bit serial fashion;
   c. comparing means coupled to said number of dayclock modules for comparing the dayclock time with the predetermined elapse time by comparing the number of dayclock bits in each of the number of dayclock modules with the number of corresponding compare bits in each of the number of dayclock modules, said comparing means providing a predetermined compare control signal between predetermined ones of the number of dayclock modules wherein the predetermined compare control signal is transmitted between the predetermined ones of the number of dayclock modules in a bit serial fashion; and
   d. output means coupled to said comparing means for providing an output signal when said comparing means determines that said dayclock time has a predetermined relationship with the predetermined elapse time.

2. A modular dayclock system according to claim 1 wherein said advancing means comprises a number of counters wherein each of the number counters is coupled to one of the number of dayclock modules, each of said number of counters incrementing said predetermined number of corresponding dayclock bits.

3. A modular dayclock system according to claim 2 wherein said predetermined advance control signal comprises a carry signal provided by each of the number of counters wherein each of the carry signals is transmitted between the number of counters in a bit serial fashion.

4. A modular dayclock system according to claim 3 wherein said comparing means comprises a number of comparators wherein each of the number of comparators is coupled to one of the number of dayclock modules, each of said number of comparators comparing said predetermined number of dayclock bits with said predetermined number of corresponding compare bits.

5. A modular dayclock system according to claim 4 wherein said predetermined compare control signal comprises a greater-than or equal to (GE) signal provided by each of the number of comparators wherein each of the GE signals is transmitted between the number of comparators in a bit serial fashion.

6. A modular dayclock system for maintaining a dayclock time in a data processing system wherein the dayclock time is stored as a number of dayclock bits and wherein a predetermined elapse time is stored as a number of compare bits, comprising:
   a. a first dayclock module including:
      i. a first sequencer for controlling the operation of the first dayclock module;
      ii. a first increment logic block for generating a first portion of the dayclock time by incrementing a number of bits in a binary fashion thereby resulting in the number of dayclock bits, said increment logic block receiving a carry input signal and providing a carry output signal;
      iii. a first dayclock register coupled to said first increment logic block and further coupled to said first sequencer for periodically storing the dayclock bits generated by said first increment logic block;
      iv. a first comparison register for storing a first portion of the number of compare bits;
      v. a first comparator coupled to said first dayclock register and further coupled to said first comparison register for comparing the first portion of the number of dayclock bits with the first portion of the number of compare bits, said comparator receiving a greater than or equal to (GE) input signal and providing a GE output signal;
      vi. a first output multiplexer coupled to said first dayclock register and further coupled to said first comparator for selecting either the carry output signal or the GE output signal;
   b. a second dayclock module including:
      i. a second sequencer for controlling the operation of the second dayclock module;
      ii. a second increment logic block for generating a second portion of the dayclock time by incrementing a number of bits in a binary fashion thereby resulting in the number of dayclock bits, said increment logic block receiving the first carry output signal from the first output multiplexer in a bit serial fashion;
      iii. a second increment register coupled to said second dayclock register and further coupled to said second sequencer for periodically storing the dayclock bits generated by said second increment logic block;
      iv. a second comparison register for storing a second portion of the number of compare bits; and
      v. a second comparator coupled to said second dayclock register and further coupled to said second comparison register for comparing the second portion of the number of dayclock bits with the second portion of the number of compare bits, said comparator receiving the GE output signal from the first output multiplexer in a bit serial fashion, and providing an interrupt output signal to the data processing system.

7. A modular dayclock system according to claim 6 wherein said first dayclock module and said second dayclock module are provided on separate substrates.

8. A modular dayclock system according to claim 6 wherein said first dayclock module includes a redundant first increment register, a redundant first comparison register, a redundant first increment counter, and a redundant first comparator.

9. A modular dayclock system according to claim 6 wherein said second dayclock module includes a redundant second dayclock register, a redundant second comparison register, a redundant second increment logic block, and a redundant second comparator.

10. A modular dayclock system according to claim 6 wherein the data processing system may read the dayclock bits stored in the first dayclock register.

11. A modular dayclock system according to claim 10 wherein the data processing system may read the dayclock bits stored in the first dayclock register at any time.

12. A modular dayclock system according to claim 11 wherein the data processing system may read the dayclock bits stored in the second dayclock register.

13. A modular dayclock system according to claim 12 wherein the data processing system may read the dayclock bits stored in the second dayclock register at any time.

14. A modular dayclock system according to claim 13 wherein said first dayclock register periodically stores the dayclock bits generated by said first increment logic block in a parallel fashion.

15. A modular dayclock system according to claim 13 wherein said second dayclock register periodically stores the dayclock bits generated by said second increment logic block in a parallel fashion.

16. A method for maintaining time in a data processing system wherein the data processing system includes a first dayclock module and a second dayclock module, comprising the steps of:
   a. providing a carry signal from the first dayclock module to the second dayclock module in a bit serial fashion;
   b. providing an incremented value based on the stored value in the second dayclock module utilizing the carry signal provided by the first dayclock module, said first value stored in said first dayclock register and said second value stored in said second dayclock register forming a collective counter value;
   c. comparing the value stored in the first dayclock register with a value stored in a first compare register, and providing a greater than or equal to (GE) signal to the second dayclock module;
   d. comparing the value stored in the second dayclock register with a value stored in a second compare register, said first value stored in said first compare register and said second value stored in said second compare register forming a collective compare value;
   e. repeating steps (a) through (d) if the collective counter value is less than the collective compare value; and
   f. providing an output signal to the data processing system if the collective dayclock register value is greater than or equal to (GE) the collective compare value.

17. A method according to claim 16 wherein said incrementing step (a) is performed during a first clock cycle.

18. A method according to claim 17 wherein said incrementing step (b) is performed during a second clock cycle.

19. A method according to claim 18 wherein said comparing step (c) is performed during a first predetermined clock cycle following the second clock cycle.

20. A method according to claim 19 wherein said comparing step (d) is performed during a second predetermined clock cycle following the first predetermined clock cycle.

21. A method for maintaining time in a data processing system wherein the data processing system includes a number of dayclock modules wherein each of the number of dayclock modules stores a portion of a dayclock time word and a portion of a dayclock compare word, comprising the steps of:
   a. providing a corresponding first carry signal from the first dayclock module to a next succeeding one of the number of dayclock modules in a bit serial fashion;
   b. providing an incremented value based on the stored value in the portion of the dayclock time word corresponding to the next succeeding one of the number of dayclock modules and providing a corresponding carry signal to the next succeeding one of the number of dayclock modules in a bit serial fashion;
   c. repeating step (b) until the last one of the number of dayclock modules increments the portion of the dayclock time word corresponding thereto;
   d. storing each of the portions of the dayclock time word to a corresponding memory within each of the number of dayclock modules;
   e. comparing the portion of the dayclock time word stored in the corresponding memory of the first one of the number of dayclock modules with the corresponding portion of the dayclock compare word, and providing a greater than or equal to (GE) signal to a next succeeding one of the number of dayclock modules in a bit serial fashion;
   f. comparing the portion of the dayclock time word stored in the corresponding memory of the next succeeding one of the number of dayclock modules with the corresponding portion of the dayclock compare word, and providing a corresponding GE signal to the next succeeding one of the number of dayclock modules in a bit serial fashion; and
   g. repeating step (f) until the portion of the dayclock word stored in the corresponding memory of the last one of the number of dayclock modules is compared with the corresponding portion of the dayclock compare word, wherein said last one of the number of dayclock modules provides an output signal to the data processing system.

22. A method according to claim 21 wherein each of steps (a) through (g) is performed during a unique clock cycle.

* * * * *